(12) United States Patent
Nakagawa

(10) Patent No.: US 7,880,940 B2
(45) Date of Patent: Feb. 1, 2011

(54) IMAGE PROCESSING APPARATUS AND IMAGE READING APPARATUS FOR REDUCING STORAGE CAPACITY OF STORAGE UNIT THEREOF

(75) Inventor: Jun Nakagawa, Hachioji (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 823 days.

(21) Appl. No.: 11/780,851

(22) Filed: Jul. 20, 2007

(65) Prior Publication Data

US 2008/0074712 A1    Mar. 27, 2008

(30) Foreign Application Priority Data

Sep. 27, 2006    (JP) .............................. 2006-262977

(51) Int. Cl.
*H04N 1/04* (2006.01)
*H04N 1/46* (2006.01)

(52) U.S. Cl. ........................................ 358/474; 358/505

(58) Field of Classification Search ................ 358/474, 358/488, 496, 505, 525, 498; 382/293–296, 382/300, 302; 399/371, 372, 394; 347/249
See application file for complete search history.

(56) References Cited

U.S. PATENT DOCUMENTS

| | | | | |
|---|---|---|---|---|
| 5,043,744 A | * | 8/1991 | Fantuzzo et al. | ............ 347/250 |
| 5,046,796 A | * | 9/1991 | Andoh et al. | ............ 359/216.1 |
| 5,764,611 A | * | 6/1998 | Watanabe | .................... 386/113 |
| 5,771,062 A | * | 6/1998 | Nomura et al. | ............. 347/257 |
| 6,301,022 B1 | | 10/2001 | Washio et al. | |
| 6,647,155 B2 | | 11/2003 | Washio et al. | |
| 6,933,957 B2 | * | 8/2005 | Omori et al. | ................. 347/249 |

FOREIGN PATENT DOCUMENTS

| | | |
|---|---|---|
| JP | 7-79321 | 3/1995 |
| JP | 10-336425 | 12/1998 |
| JP | 2000-59611 | 2/2000 |

* cited by examiner

*Primary Examiner*—Gabriel I Garcia
(74) *Attorney, Agent, or Firm*—Finnegan, Henderson, Farabow, Garrett & Dunner, L.L.P.

(57) ABSTRACT

An image processing apparatus including: a storage unit including a plurality of memory modules, the storage unit storing image data having been subjected to a main scanning shift processing into the memory modules; and a control unit dividing a first memory area at a center position of main scanning, the first memory area set to increase a total storage capacity as a shift amount in a sub scanning direction becomes larger, the control unit superposing the divided first memory areas so as to counteract memory un-use areas to set a second memory area, the control unit selecting the memory modules corresponding to the second memory area to read and write the image data, the control unit thereby performing sub scanning shift processing of the image data.

12 Claims, 18 Drawing Sheets

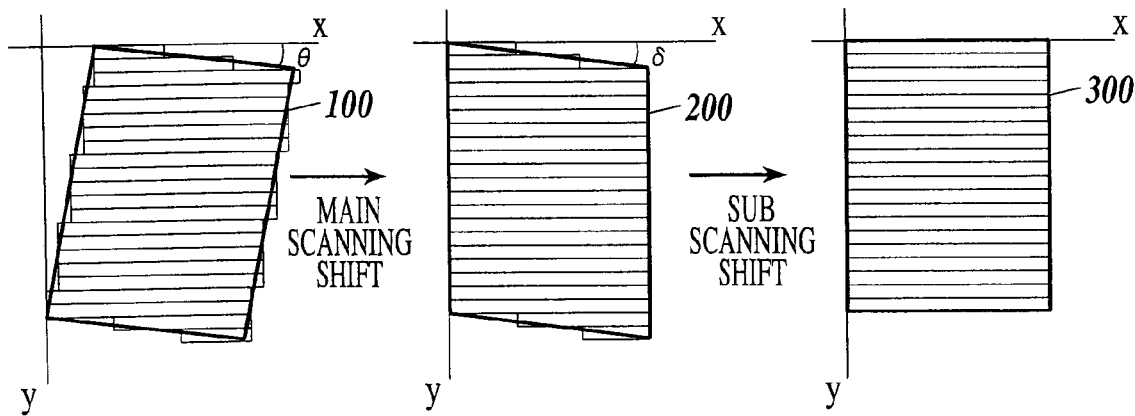
*FIG.5A* *FIG.5B* *FIG.5C*
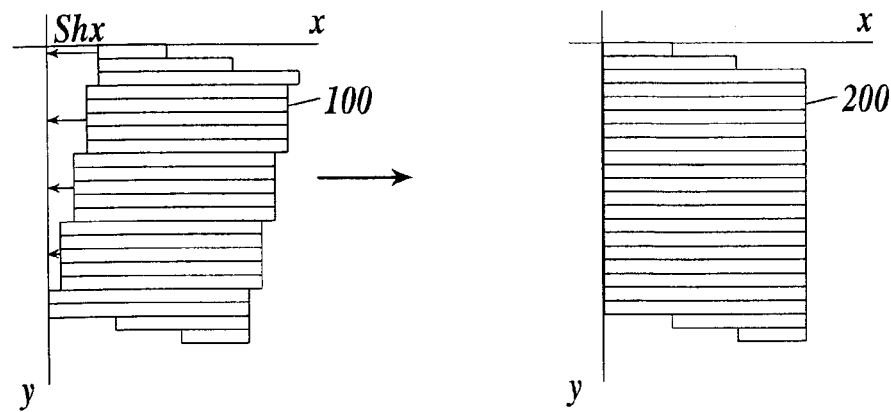
*FIG.6A* *FIG.6B*

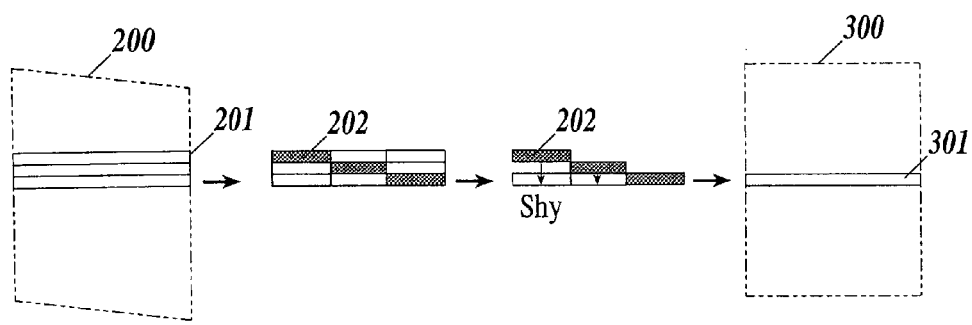
*FIG.7A*  *FIG.7B*  *FIG.7C*  *FIG.7D*
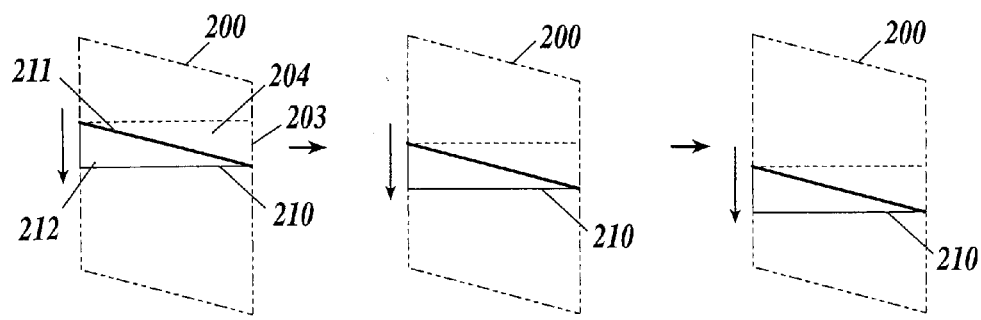
*FIG.8A*  *FIG.8B*  *FIG.8C*

FIG.11A
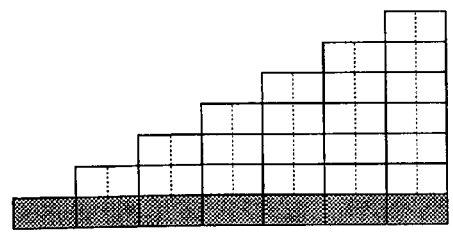
FIG.11B
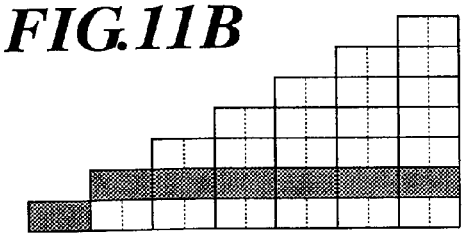
FIG.11C
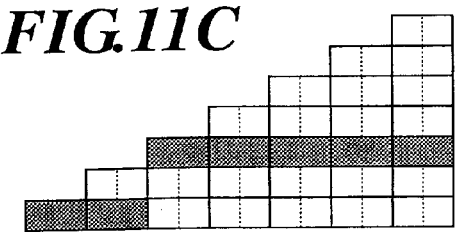
FIG.11D
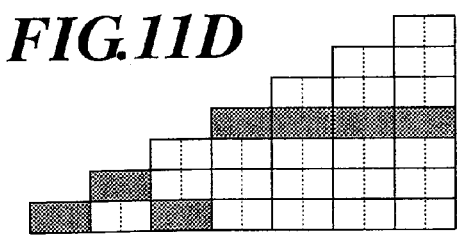
FIG.11E
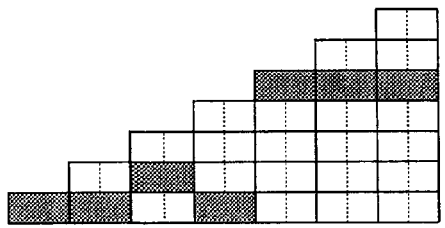
FIG.11F
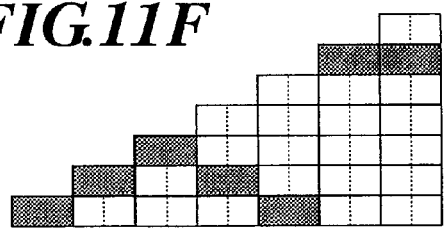
FIG.11G
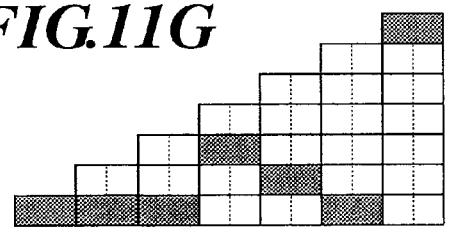
FIG.11H
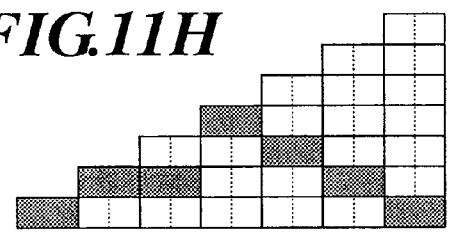

IMAGE PROCESSING APPARATUS AND IMAGE READING APPARATUS FOR REDUCING STORAGE CAPACITY OF STORAGE UNIT THEREOF

BACKGROUND OF THE INVENTION

1. Field of the Invention

The present invention relates to an image processing apparatus and an image reading apparatus.

2. Related Art

A technique which corrects image data obtained by reading an inclined original to form a not inclined image on a sheet of recording paper at the time of reading the image by scanning the original in the main scanning direction and in the sub scanning direction in a copier, has been developed.

As a method of the original inclination correction processing, there is a method of performing the original inclination correction processing by grasping image data as an assembly of linear data in the main scanning direction or an assembly of linear data in the sub scanning direction to combine main scanning shift processing of shifting the linear data in the main scanning direction (lateral direction), which constitutes the image, into the main scanning direction and sub scanning shift processing of shifting linear data in the sub scanning direction (longitudinal direction) into the sub scanning direction (see, for example, JP 2000-59611A).

Moreover, a configuration which secures a minimum required rectangular memory area as an input buffer in the sub scanning shift processing and selects the data in the input buffer according to an inclination angle to correct the selected data (see, for example, JP Hei 7-79321A), has been also developed.

FIG. 20 shows an outline of conventional sub scanning shift processing. As shown in FIG. 20, a case where inclined image data 200 after main scanning shift processing is subjected to sub scanning shift processing will be examined. The image data corresponding to a rectangular memory area 230 for predetermined lines is stored into a first-in first-out (FIFO) memory, and the image data in a reading area 231 in the memory area 230 is read from the stored image data. The inclination of the reading area 231 corresponds to the inclination of the image data 200. After the reading of the image data in the reading area 231, the memory area 230 is shifted for one pixel into the sub scanning direction (into the lower direction of the figure). By repeating this process, a sheet of image data the inclination of which has been corrected is obtained.

The correction is performed by the pixel in the main scanning shift processing and in the sub scanning shift processing. Accordingly, an error produced in an area smaller than one pixel has been processed by interpolation processing after each shift processing.

However, the storage capacity of the FIFO memory used for the sub scanning shift processing in the conventional image data inclination correction is required to be further reduced.

As shown in FIG. 20, the rectangular memory area 230 includes a read area 232 and a delay area 233 with a reading area 231 as a border. The delay area 233 includes the image data that has not been read yet. The read area 232 includes the image data that has been read in the reading area 231. Consequently, the FIFO memory has had a storage capacity for storing the memory area 230 including the unnecessary read area 232. Accordingly, it has been required to reduce the cost of the FIFO memory by reducing the storage capacity of the FIFO memory.

In order to prevent the storage capacity of the FIFO memory from enlarging, multileveling processing has been performed before the sub scanning shift processing to reduce the number of the bits of image data, and then the processing such as error diffusion has been performed. Accordingly, even if the FIFO memories having the same storage capacities are used, it has been required not to perform the multileveling processing at the time of the sub scanning shift processing to reproduce the pattern of the error diffusion.

In order to settle the problem mentioned above, a configuration can be considered which reduces the storage capacity of a FIFO memory used for the sub scanning shift processing by storing only the reading area 231 and the delay area 233 into the FIFO memory to perform the multileveling processing after the sub scanning shift processing. In this case, the capacity of the FIFO memory also increases according to the number of gradations of image data and inclination correction performance.

Because all the memories of a FIFO memory are always driven, the power consumption of the memory increases according to the increase of the capacity of the memory. Accordingly, it is required to reduce the power consumption of the FIFO memory. Because the calorific value of a memory increases as the power consumption of the memory increases, there is also the aspect of the problem of the difficulty of mounting the memory on an application specific integrated circuit (ASIC).

SUMMARY OF THE INVENTION

Accordingly, an object of the present invention is to reduce the storage capacity of a storage unit used for a sub scanning shift, and to reduce the power consumption and the calorific value of the storage unit.

In order to achieve at least one of the above objects, an image processing apparatus reflecting one aspect of the present invention, comprises:

a storage unit including a plurality of memory modules, the storage unit storing image data having been subjected to a main scanning shift processing into the memory modules; and a control unit dividing a first memory area at a center position of main scanning, the first memory area set to increase a total storage capacity as a shift amount in a sub scanning direction becomes larger, the control unit superposing the divided first memory areas so as to counteract memory un-use areas to set a second memory area, the control unit selecting the memory modules corresponding to the second memory area to read and write the image data, the control unit thereby performing sub scanning shift processing of the image data.

In the image processing apparatus, preferably, the memory modules are separately arranged in a plurality of areas with regard to a main scanning direction in the storage unit, and the control unit selects one of the plurality of areas in the main scanning direction to perform the reading and the writing of the image data.

Preferably, in the image processing apparatus, the control unit circularly selects the memory modules to which the reading and the writing of the image data are performed according to the shifting amount of the sub scan shifting.

Preferably, in the image processing apparatus, the control unit includes:

a sub scanning shift control unit outputting an address in a first direction for the reading and the writing of the storage unit;

a counter counting a counted value indicating a circulation amount according to the shift amount of the sub scan shifting;

a first selector selecting the counted value to output the selected counted value as an address in a second direction of the first memory area; and an address changing unit changing the address in the second direction of the first memory area into an address in the second direction of the second memory area based on a most significant bit of the address in the first direction.

Preferably, the image processing apparatus further comprises a second selector switching the image data input after being subjected to the main scanning shift processing and the image data read from the storage unit to output the switched image data.

Preferably, the image processing apparatus further comprises an interpolation processing unit performing interpolation processing of the image data having been subjected to the main scanning shift processing, wherein the control unit performs the sub scanning shift processing to the image data subjected to the interpolation processing.

BRIEF DESCRIPTION OF THE DRAWINGS

The present invention will become more fully understood from the detailed description given hereinafter and the accompanying drawings, and these are not intended to limit the present invention, and wherein:

FIG. 5A is a view showing image data after image reading, FIG. 5B is a view showing the image data after main scanning shift processing, and FIG. 5C is a view showing the image data after sub scanning shift processing;

FIG. 6A is a view showing the configuration of image data, and FIG. 6B is a view showing the configuration of the image data;

FIG. 7A is a view showing a rectangular area in sub scanning shift processing, FIG. 7B is a view showing a reading area in the rectangular area, FIG. 7C is a view showing a reading procedure in the reading area, and FIG. 7D is a view showing read data;

FIGS. 8A, 8B, and 8C are views showing a state of a movement of a memory area;

FIGS. 11A, 11B, 11C, 11D, 11E, 11F, 11G, and 11H are views showing a transition of data reading and writing of the memory modules in the case where the inclination angle δ is negative and a coefficient stair V=2;

DETAILED DESCRIPTION OF THE PREFERRED EMBODIMENTS

In the following, an embodiment according to the present invention will be described in detail with reference to the attached drawings. However, the scope of the invention is not limited to the shown examples.

Figure 1:
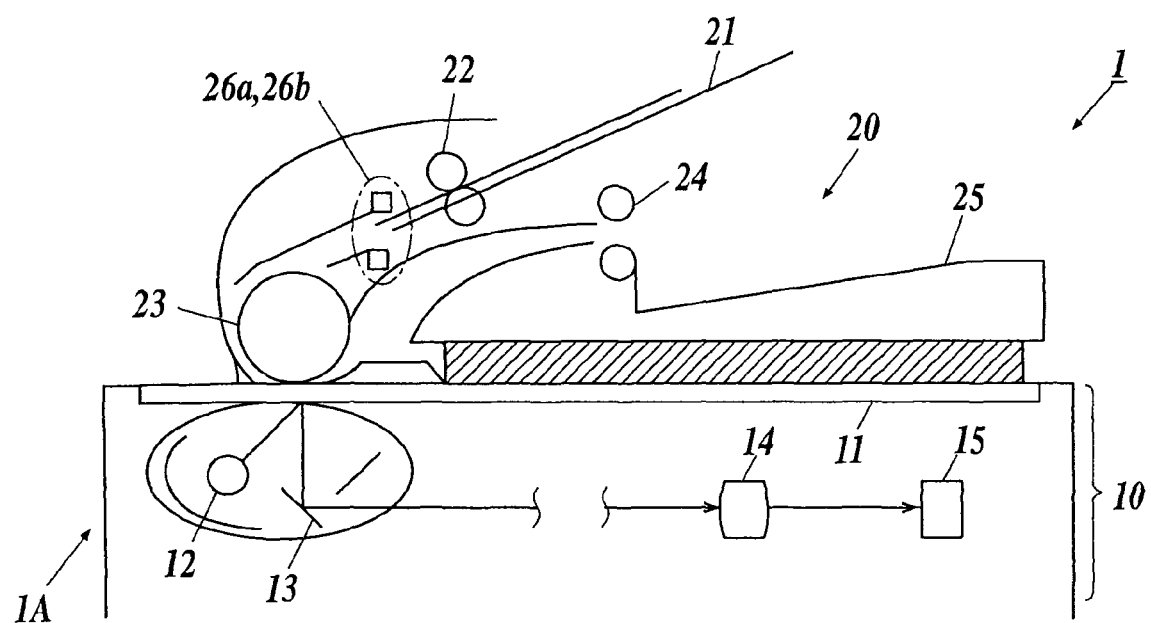
FIG. 1 is a view showing the mechanical configuration of a digital copier of an embodiment according to the present invention.

First, the apparatus configuration of a digital copier 1 of the present embodiment will be described with reference to FIGS. 1-4. FIG. 1 shows the mechanical configuration of the digital copier 1 of the present embodiment.

The digital copier 1 is provided with a copier main body 1A and an original conveying unit 20. The original conveying unit 20 is produced as a separate unit from the copier main body 1A and is attached to the copier main body 1A.

The copier main body 1A has a scanner 10 as an image reading apparatus. The scanner 10 is provided with an original placing stand 11, an original light source 12, a mirror 13, an image forming lens 14, and a line sensor 15. Moreover, the copier main body 1A is provided with a main body control unit 60, an operation unit 70, a printer unit 50, and the like, as will be described later.

An original to be read is placed on the original placing stand 11, and the original placing stand 11 forms a passage of the original and an illuminating position of the original at the time of reading the moving original. The original light source 12 emits light while freely moving along the original placing stand 11. The mirror 13 can freely move with the original light source 12. The image forming lens 14 focuses an incident light on the line sensor 15. The line sensor 15 has a charge-coupled device (CCD) or the like, and converts an entered light signal into an electric signal to output the electric signal.

A light emitted from the original light source 12 is reflected by the original and enters the line sensor 15 through the mirror 13 and the image forming lens 14.

The original conveying unit 20 is equipped with a paper feeding tray 21, paper feeding rollers 22, a roller 23, paper ejecting rollers 24, a copy receiving tray 25, and sensors 26a and 26b.

Originals that are the objects of reading the image formed thereon are placed on the paper feeding tray 21. The paper feeding rollers 22 convey the originals placed on the paper feeding tray 21 one by one. The roller 23 conveys the original conveyed by the paper feeding rollers 22 to a reading position, and further conveys the original into a fixed direction at the reading position. The paper ejecting rollers 24 eject the original conveyed by the roller 23. The copy receiving tray 25 places the ejected original thereon.

The sensors 26a and 26b are severally composed of a photo-projector and a photo-receiver, and sense the passing of an original. The sensors 26a and 26b are disposed just behind the paper feeding rollers 22 perpendicularly to the original conveyance direction so as to put the original conveyance path between the sensors 26a and 26b.

The originals on the paper feeding tray 21 are separated one by one by the paper feeding rollers 22, and the separated originals pass the roller 23 and paper ejecting rollers 24 to be transmitted to the copy receiving tray 25.

The line sensor 15 scans an original passing the reading position formed of the original placing stand 11 and the roller 23 in the main scanning direction, which is the line direction, and in the sub scanning direction, which is the movement direction of the original, and the image reading of an original movement system is thus performed.

The digital copier 1 can also perform the image reading of an original rest system. That is, the image reading of an original placed on the original placing stand 11 can be performed by moving the original light source 12 and the mirror 13.

The sensors 26a and 26b sense the angle at the front edge of an original conveyed through the original conveyance path, namely the inclination of the running original in the original conveying unit 20. Incidentally, as the sensors sensing the inclination of the original, arbitrary well-known sensors can be used.

Figure 2:
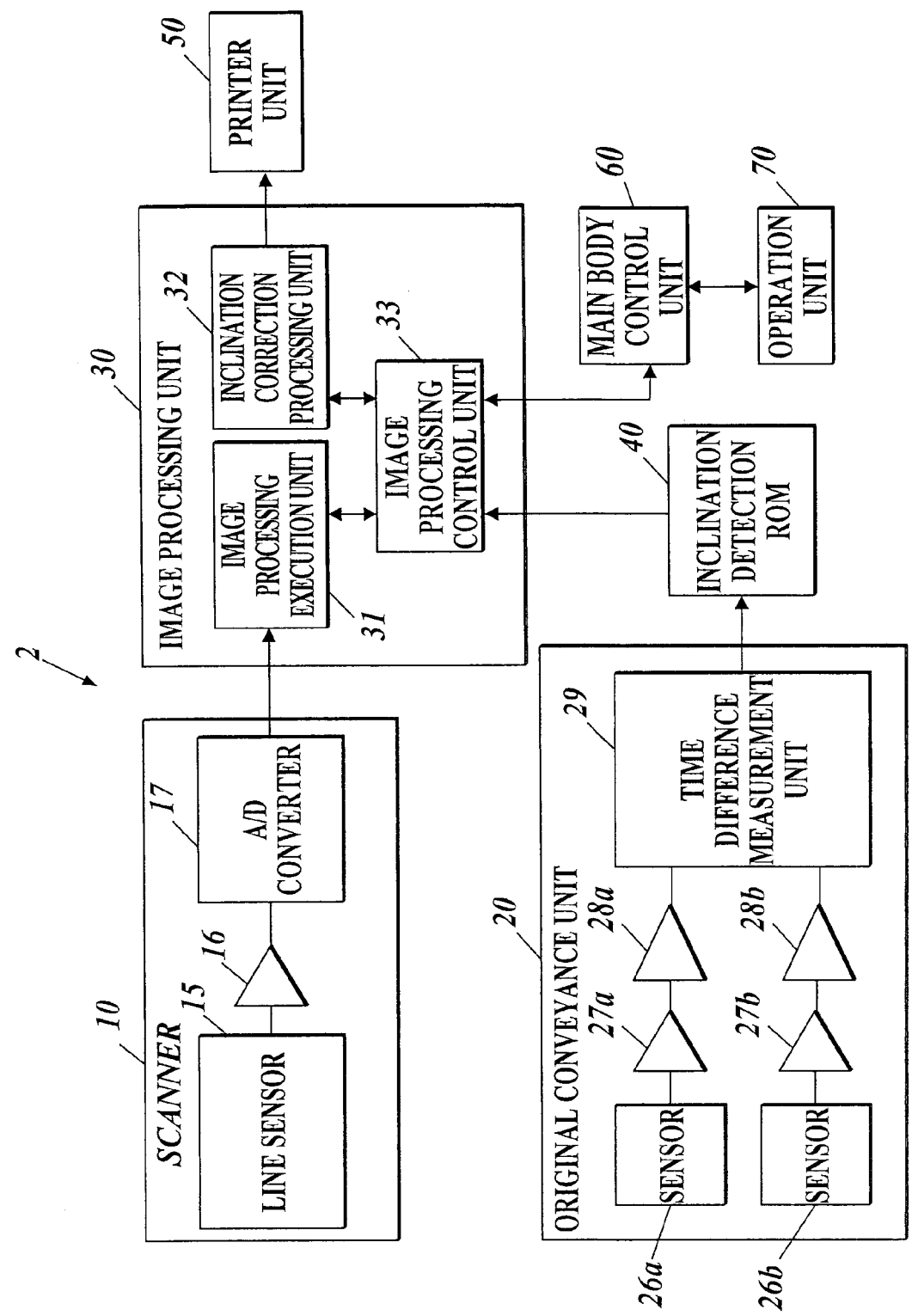
FIG. 2 is a block diagram showing the electric configuration of an image reading apparatus.

FIG. 2 shows the electric configuration of an image reading apparatus 2. As shown in FIG. 2, the image reading apparatus 2 is an apparatus reading an original image, and is provided in the digital copier 1.

As shown in FIG. 2, the image reading apparatus 2 is provided with the scanner 10, the original conveying unit 20, an image processing unit 30, and an inclination detection read only memory (ROM) 40. Moreover, the digital copier 1 includes the printer unit 50, the main body control unit 60 and the operation unit 70 besides the image reading apparatus 2.

The scanner 10 reads the image of an original to output the image data of the image. The scanner 10 includes an amplifier 16 and an A/D converter 17 besides the line sensor 15. The amplifier 16 amplifies an electric signal output from the line sensor 15. The A/D converter 17 converts an analog electric signal output from the amplifier 16 into digital image data to output the digital image data.

The original conveying unit 20 includes amplifiers 27a and 27b, comparators 28a and 28b, and time difference measuring unit 29 besides the sensors 26a and 26b. The amplifiers 27a and 27b amplify the outputs of the sensors 26a and 26b. The comparators 28a and 28b compare the outputs of the amplifiers 27a and 27b with threshold values to output the signals corresponding to the passing times of the front edge of the original. The time difference measuring unit 29 calculates the time difference s between the outputs of the comparators 28a and 28b, and outputs the calculated time difference.

In the original conveying unit 20, the information of the inclination angle θ of the conveyed original in the main scanning direction thereof are sensed by the sensors 26a and 26b, and the time difference s is calculated by the time difference measuring unit 29. If it is supposed that the distance between the sensors 26a and 26b is denoted by d and the conveyance speed of the original is denoted by v, then the inclination angle θ can be expressed by the following formula (1):

$$\theta = \tan^{-1}(s \cdot v/d) \qquad (1).$$

The inclination detection ROM 40 stores the relations among the time differences s, the inclination angles θ, and stairs H and stairs V expressed by the following formulae (2) and (3), respectively:

$$\text{stair } H = (\text{int})(1/\tan \theta) \qquad (2) \text{ and}$$

$$\text{stair } V = (\text{int})(1/\tan \delta) \qquad (3).$$

In the formulae (2) and (3), (int) denotes changing to an integer by truncating the digits after decimal point, and δ denotes the changed angle of the inclination angle θ of an original by main scanning shift processing, which will be described later. The angle δ can be expressed by the following formula (4):

$$\delta = \tan^{-1}\{1/(\tan \theta + 1/\tan \theta)\} \qquad (4).$$

The stair H indicates the number of pixels in the sub scanning direction from a certain pixel set as the origin the pixel at which number of pixels is needed to be shifted by one pixel into the main scanning direction in order to remove the inclination of an image. The stair V indicates the number of pixels in the main scanning direction from a certain pixel set as the origin the pixel at which number of pixels is needed to be shifted by one pixel into the sub scanning direction in order to remove the inclination of an image.

The image processing unit 30 performs various kinds of image processing to the image data output from the scanner 10. The image processing unit 30 is provided with an image processing execution unit 31, an inclination correction processing unit 32, and an image processing control unit 33. The image processing execution unit 31 performs filtering processing, power varying processing, and the like of image data composed of the data for one line in the main scanning direction which data is serially output from the scanner 10 by the pixel in the sub scanning direction based on the control of the image processing control unit 33. The inclination correction processing unit 32 performs the inclination correction processing in the main scanning direction and in the sub scanning direction and the interpolation processing of the image data after the image processing, which image data output from the image processing execution unit 31, based on the control of the image processing control unit 33, and the inclination correction processing unit 32 outputs the processed image data.

The image processing control unit 33 is provided with a central processing unit (CPU), a random access memory (RAM), and a ROM. In the image processing control unit 33, various programs read from the ROM are expanded on the RAM, and various kinds of processing are executed by the cooperation of the programs on the RAM and the CPU.

The image processing control unit 33 controls the image processing execution unit 31 and the inclination correction processing unit 32 based on the control of the main body control unit 60. Moreover, the image processing control unit 33 calculates the stair H and the stair V based on the time difference s and the angle θ, which are output from the original conveying unit 20, and the information stored in the inclination detection ROM 40. The image processing control unit 33 uses the stair H and the stair V to control the inclination correction processing unit 32.

The printer unit 50 performs printing (image formation) onto a recording medium such as a sheet of recording paper based on the image data output from the image processing unit 30. The printing system of the printer unit 50 is any one of the electrophotographic system, the ink-jet system, the thermal transfer system, and the like.

The operation unit 70 is provided with various keys to receive a user's operation input, and outputs the input information to the main body control unit 60. Moreover, the operation unit 70 is provided with a display unit such as a liquid crystal display (LCD), and performs display based on display information input from the main body control unit 60. The operation unit 70 may integrally constitute a touch panel together with the display unit. The operation unit 70 can receive setting inputs of the printing conditions of image data, such as variable power and image quality.

The main body control unit 60 includes a CPU, a RAM, and a ROM. In the main body control unit 60, various kinds of processing are executed by the cooperation of various programs read from the ROM to be expanded in the RAM with the CPU. The main body control unit 60 performs the central control of each unit, such as the image processing control unit 33, in the digital copier 1. The main body control unit 60 especially performs copy processing, which will be described later, based on a copying program.

Figure 3:
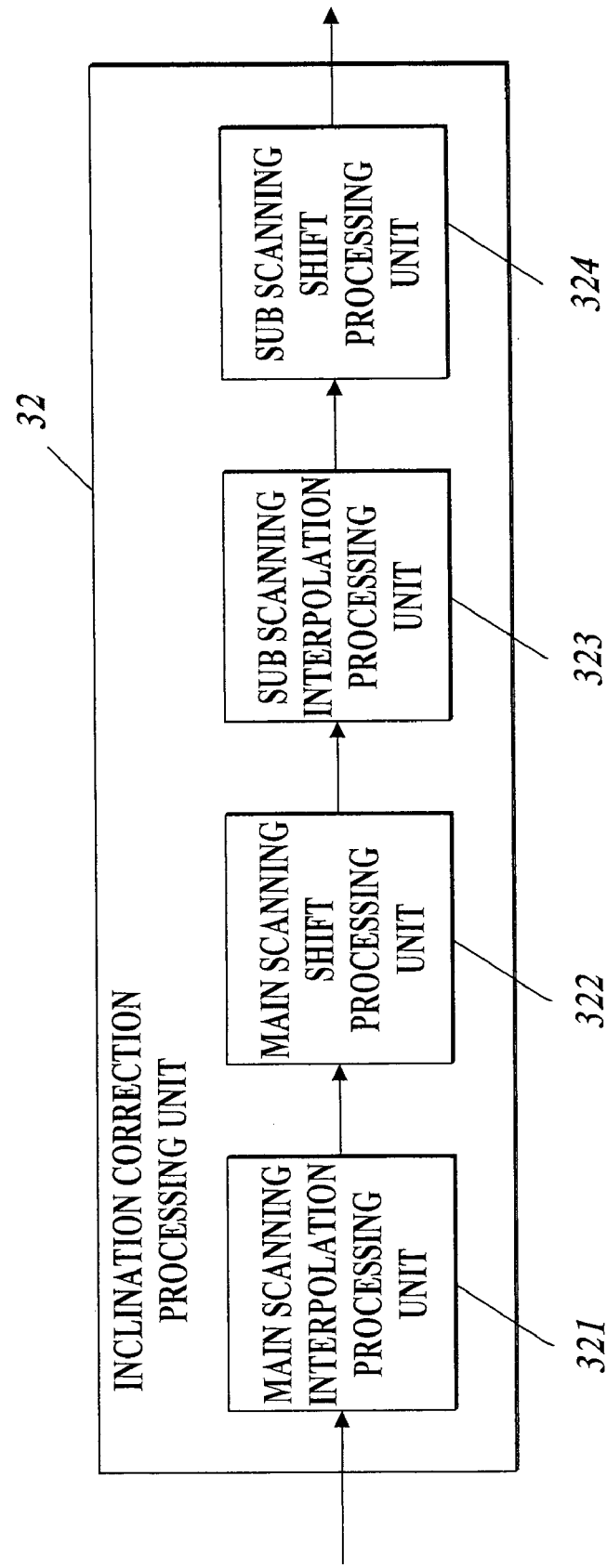
FIG. 3 is a block diagram showing the internal configuration of an inclination correction processing unit.

FIG. 3 shows the internal configuration of the inclination correction processing unit 32. As shown in FIG. 3, the inclination correction processing unit 32 is provided with a main scanning interpolation processing unit 321, a main scanning shift processing unit 322, a sub scanning interpolation processing unit 323, and the sub scanning shift processing unit 324.

The main scanning interpolation processing unit 321 performs main scanning interpolation processing to the image data output from the image processing execution unit 31 to output the processed image data. The main scanning shift processing unit 322 performs main scanning shift processing to the image data output from the main scanning interpolation processing unit 321 to output the processed image data. The main scanning shift processing unit 322 is provided with a not shown line memory, and stores each line data of image data into the line memory to perform a shift of each line in the main scanning direction by the position adjustment of the line data in the line memory.

The sub scanning interpolation processing unit 323 performs sub scanning interpolation processing to the image data output from the main scanning shift processing unit 322 to output the processed image data. The sub scanning shift processing unit 324 performs sub scanning shift processing to the image data output from the sub scanning interpolation processing unit 323, and outputs the processed image data.

Figure 4:
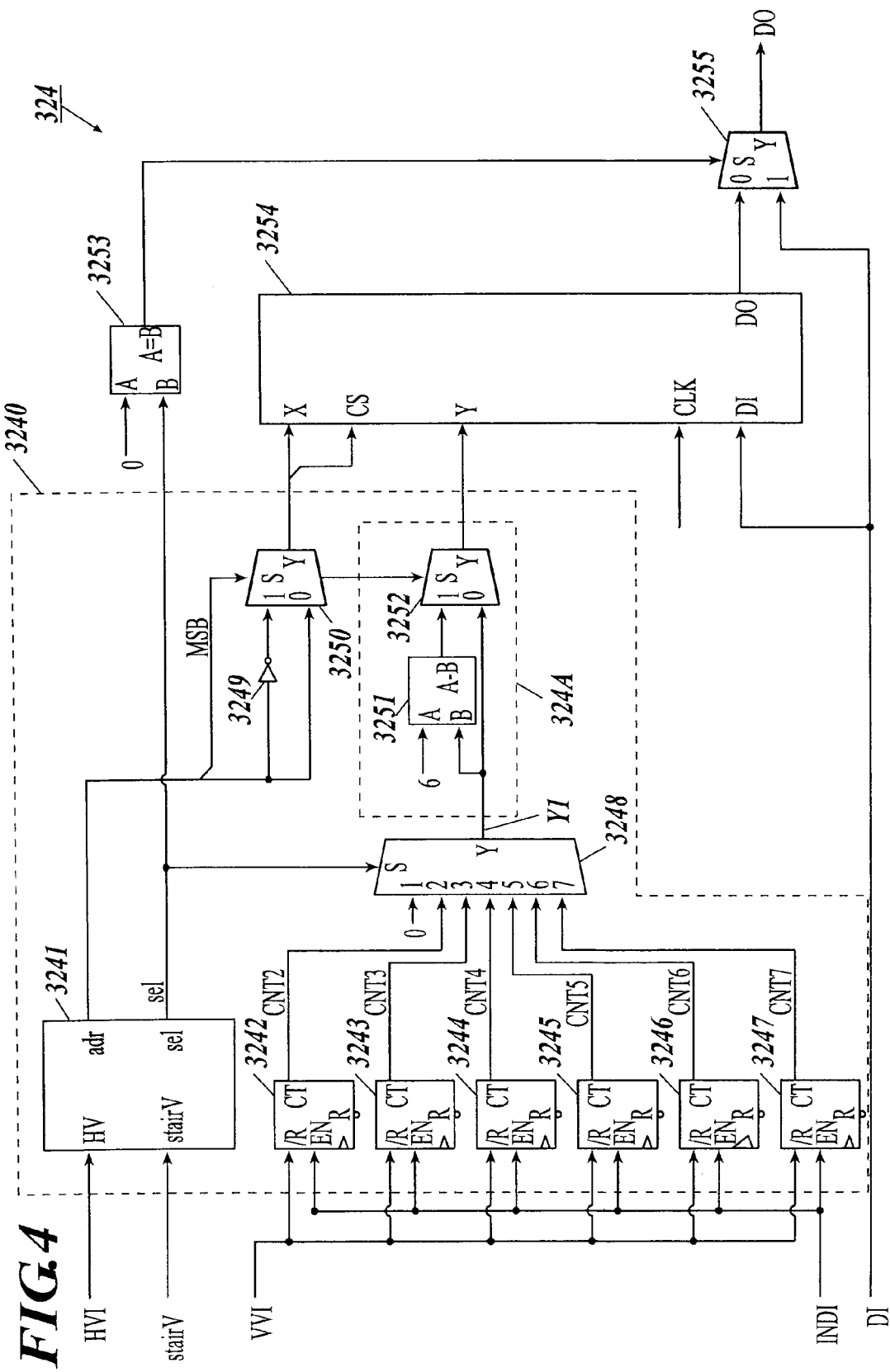
FIG. 4 is a diagram showing the internal configuration of a sub scanning shift processing unit.

FIG. 4 shows the internal configuration of the sub scanning shift processing unit 324. In the present embodiment, a configuration will be examined in which the sub scanning shift processing unit 324 can shift image data in the sub scanning direction for six pixels at the maximum in the sub scanning shift processing. However, the shift amount is not limited to the above configuration.

As shown in FIG. 4, the sub scanning shift processing unit 324 is provided with a control unit 3240, a comparator 3253, a storage unit 3254, and a selector 3255 as a second selector. The control unit 3240 is provided with a sub scanning shift control unit 3241, counters 3242-3247, a selector 3248 as a first selector, an inverting unit 3249, a selector 3250, and an address changing unit 324A. The address changing unit 324A is provided with a subtracting unit 3251 and a selector 3252.

Although it is not shown in FIG. 4, the sub scanning shift processing unit 324 includes a signal generating unit outputting a main scanning effective signal HVI, a sub scanning effective signal VVI, and a main scanning synchronizing signal INDI, all of which will be described later, by the control of the image processing control unit 33.

The sub scanning shift control unit 3241 operates based on a clock signal (not shown) to generate a selection signal sel and an address signal adr based on the main scanning effective signal HVI input from the signal generating unit and the coefficient stair V input from the image processing control unit 33. The sub scanning shift control unit 3241 outputs the selection signal sel to the selector 3248 and the comparator 3253, and outputs the address signal adr to the inverting unit 3249 and the selector 3250.

The main scanning effective signal HVI is a positive logic binary signal, and is a signal indicating whether the data signal DI output from the image processing execution unit 31 is effective or not. The selection signal sel is a control signal of the input changing of the selector 3248. The address signal adr is a signal specifying an address of the storage unit 3254. The most significant bit of the address signal adr is input into the selectors 3250 and 3252 as a signal MSB for dividing a memory area, which will be described later, into two parts. The division of the memory area into two parts will be described later. The address signal adr is input into the inverting unit 3249 and the selector 3250. The address signal adr inverted by the inverting unit 3249 is input into the selector 3250.

The selector 3250 selects either of the address signal adr and the address signal adr inverted by the inverting unit 3249 based on the signal MSB, and outputs the selected address signal adr to the storage unit 3254 as an address signal X indicating the address of the storage unit 3254 in an X direction. To put it concretely, when the signal MSB is 1, the inverted signal of the address signal adr is selected, and when the signal MSB is 0, the noninverted signal of the address signal adr is selected. The higher-order bit of the address signal adr is input into the storage unit 3254 as a selection signal CS of the storage unit 3254.

The counters 3242-3247 severally receives the inputs of the sub scanning effective signal VVI and the main scanning synchronizing signal INDI, and output signals CNT2-CNT7, respectively. The sub scanning effective signal VVI is a sub scanning effective signal indicating whether a sub scanning shift is effective or not in the positive logic. The main scanning synchronizing signal INDI is a signal taking a high level for a predetermined time every main scanning line. The counter signals CNT2-CNT7 are signals indicating the addresses in a Y direction of the memory area before the division into the two parts, and are counted values circulating within the ranges of the shift quantities in the sub scanning direction in a memory area before the division into the two parts. That is, the counters 3242-3247 count the numbers of the times of the high levels of the main scanning synchronizing signal INDI, and circulate the counted values within the ranges of the shift quantities in the sub scanning direction to output the counted values as the counter signals CNT2-CNT7, respectively.

The selector 3248 selects any one of the counter signals CNT2-CNT7 input from the counters 3242-3247, respectively, based on the selection signal sel, and outputs the selected counter signal to the subtracting unit 3251 and the selector 3252 as an address signal Y1 indicating an address in the Y direction of the memory area before the division into the two parts.

The subtracting unit 3251 calculates a value obtained by subtracting the address signal Y1 from a value 6, and to output the calculated value to the selector 3252. The selector 3252 selects either of the signal input from the subtracting unit 3251 (the calculated value of 6–address signal Y1) and the address signal Y1 based on the signal MSB, and outputs the selected signal to the storage unit 3254 as an address signal Y indicating an address in the Y direction of the storage unit 3254. The address signal Y indicates an address Y in the memory area after the division into the two parts, the inversion thereof and the superposition thereof. To put it concretely, when the signal MSB is 1, the signal of (the calculated value of 6-address signal Y1) is selected, and when the signal MSB is 0, the address signal Y1 is selected.

The comparator 3253 compares the selection signal sel with an value 0, and outputs a selection signal, which takes a level 0 in the case of the selection signal sel≠0 or a level 1 in the case of the selection signal sel=0. The storage unit 3254 is a memory including a plurality of memory modules and capable of specifying a memory module to be driven, and is formed of a RAM, for example. The storage unit 3254 reads data from a memory module at a position specified by the address signal X and the selection signal CS, which are input from the selector 3250, and the address signal Y input from the selector 3252 to output the read data as a data signal DO, and writes the value of the data signal DI into the memory module, based on the address signal X, the selection signal CS, the address signal Y, a clock signal CLK, and the data signal DI.

The selector 3255 selects either of the data signal DO input from the storage unit 3254 and the data signal DI based on the selection signal input from the comparator 3253, and outputs the selected signal as a definitive data signal DO. To put it concretely, the selector 3255 outputs the data signal DO from the storage unit 3254 in the case of the selection signal=0, and outputs the data signal DI as the definitive data signal DO in the case where the selection signal=1. Moreover, the data signal DO is a data signal output from the inclination correction processing unit 32.

Next, the operation of the digital copier 1 will be described. First, the outlines of the main scanning shift processing and the sub scanning shift processing will be described. FIGS. 5A-5C show the concept of the main scanning shift processing and the sub scanning shift processing. FIG. 5A shows image data 100 after being subjected to image reading. FIG. 5B shows image data 200 after being subjected to main scanning shift processing. FIG. 5C shows image data 300 after being subjected to sub scanning shift processing.

As shown in FIG. 5A, the scanner 10 reads an inclined original, and obtains the image data 100 as an assembly of horizontal line-like data. In the following, it is supposed that an x axis is taken in the main scanning direction and y axis is taken in the sub scanning direction. It is further supposed that the angle formed by the image data 100 and the x axis is denoted as an angle θ.

The main scanning shift processing is the processing of shifting the pixels of the image data 100 into the main scanning direction every row, and is the correction processing for removing the inclinations of the vertical lines of the image data 100. The shift quantities are different from one another according to the positions on the y axis. As shown in FIG. 5B, the rectangular image data 100 receives the main scanning shift processing by the main scanning shift processing unit 322, and is changed to the parallelogram image data 200. The angle formed by the image data 200 and the x axis is supposed to be denoted as an angle δ.

The sub scanning shift processing is the processing of shifting the pixels of the image data 200 into the rectangular direction (sub scanning direction) to the direction (main scanning direction) in which the pixels have been shifted in the main scanning shift processing, and is the correction processing of making the angle δ of the image data inclined for the angle δ to the x axis be 0. As shown in FIG. 5C, the image data 200 receives the sub scanning shift processing by the sub scanning shift processing unit 324 to be changed to the image data 300 of the angle δ=0.

Next, the main scanning interpolation processing, the main scanning shift processing, the sub scanning interpolation processing, and the sub scanning shift processing will be described in detail in order.

The main scanning interpolation processing is the processing performed by the main scanning interpolation processing unit 321 to the image data that has been read by the scanner 10 and has been output from the image processing execution unit 31. The vertical lines of the image data subjected to the main scanning shift processing are macroscopically seen as a vertically connected line. However, when it is seen by the pixel, an inclined line over two pixels is broken at a position where shift quantities are different from each other. Owing to such a discontinuity, the whole image is seen to have a jagged contour. The cause of this is that the main scanning shift is performed by the integer as described above.

The main scanning interpolation processing is the processing for correcting such deterioration of the image quality. The main scanning interpolation processing is set to the processing for correcting the pixel value of a watching pixel by, for example, calculating the weighted average of the pixel value of the watching pixel and the pixel value of the adjacent pixel based on the weighting according to the shift amount of the digits after the decimal point that has been truncated by the main scanning shift processing. In the main scanning interpolation processing, a main scanning interpolation amount is calculated using the stair H, and the interpolation processing is executed based on the main scanning interpolation amount.

The main scanning shift processing is the processing performed by the main scanning shift processing unit 322 to the image data output from the main scanning interpolation processing unit 321. FIG. 6A shows the configuration of the image data 100. FIG. 6B shows the configuration of the image data 200. As shown in FIGS. 6A and 6B, the case where the main scanning shift processing is performed to the image data 100 to change the image data 100 to the image data 200 will be examined.

In the main scanning shift processing, it is repeated that each line of the image data 100 is stored in the line memory and shifted into the main scanning direction to be read by the main scanning shift processing unit 322. As shown in the arrows in FIG. 6A, it is performed to shift the pixel values into the main scanning direction on the line memory in the main scanning shift processing unit 322 in order to shift the assembly of the pixels of the image data 100 as shown by shx.

If the value of the number of pixels to be shifted into the main scanning direction on the yth line is denoted by the shx when the inclination of an original is supposed to be θ, then the shx is expressed by the following formula (5):

$$shx = y \cdot \tan\theta \tag{5}$$

Incidentally, the horizontal direction of a shift is distinguished by a sign.

In fact, because a shift can be performed only by the pixel, the shx is used as a main scanning shift amount ishx of the display by the pixel which amount ishx is defined by the following formula (6) of truncating the fractions of the shx:

$$ishx = (int)shx \tag{6}$$

where (int) indicates changing the shx to an integer.

The formula (6) can be expressed as the following formula (7) by using the coefficient stair H supplied from the image processing control unit 33 (inclination detection ROM 40) in FIG. 2:

$$ishx = (int)(y/stair H) \tag{7}$$

By shifting the pixel values on the line memory in accordance with the formula (7), the image data 100 shown in FIG. 6A is changed to the image data 200 shown in FIG. 6B, and the inclination in the main scanning direction is corrected to remove, for example, the inclinations of the vertical lines.

The sub scanning interpolation processing is the processing for correcting the pixel values of the image data the continuity of which is cut by the sub scanning shift processing, and is the processing for correcting the pixel value of a watching pixel by calculating the weighted average of the pixel value of the watching pixel and the pixel value of the adjacent pixel by using a weighting coefficient. In the sub scanning interpolation processing, a sub scanning interpolation amount is calculated using the stair V, and the interpolation processing is executed based on the sub scanning interpolation amount.

The sub scanning shift processing is the correction of shifting the pixels of the image data 200 into the sub scanning direction to make the angle δ of the image data 200 inclined by the angle δ to the y axis be 0. The shift quantities of the sub scanning shift processing take different values according to the positions on the x axis.

The data processing for the sub scanning shift processing is the processing of obtaining the image data for one line by storing the image data of the memory area in the rectangular area for a plurality of lines into the storage unit 3254 and by outputting the image data after giving the delay according to a position on the x axis.

FIG. 7A shows a rectangular area 201 in the sub scanning shift processing. FIG. 7B shows a reading area 202 in the rectangular area 201. FIG. 7C shows a reading procedure in the reading area 202. FIG. 7D shows read data 301. Incidentally, in the example of FIGS. 7A-7D, the rectangular area 201 is expressed to be composed of three lines.

For example, as shown in FIG. 7A, the rectangular area 201 is set in the image data 200. As shown in FIG. 7b, the reading area 202 corresponding to the inclination of the sub scanning direction is specified in the three-line rectangular area 201. Each line of the reading area 202 is read with a larger delay amount as the value of the x axis is smaller. As shown in FIG. 7D, the reading area 202 is read as the read data 301 of one line having no inclinations. The rectangular area 201 moves to the lower part by the pixel every reading of the reading are 202 (read data 301). Consequently, the read data 301 of all the lines is collected to constitute the image data 300 shown in FIG. 5C.

When the inclination of the image data 200 to the x axis is set to the angle δ, the pixel value of a pixel located on the shy line from a watching line is output as for the pixel at the xth column. The watching line means the lowermost main scanning line in a reading area 211. The shy is a shift amount in the sub scanning direction. The relation between a coordinate value x and a shift amount shy can be expressed by the following formula (8):

$$shy = (x0 - x) \cdot \tan\delta \quad (\delta: \text{positive}) \quad (8)$$
$$= x \cdot \tan(-\delta) \quad (\delta: \text{negative}),$$

where, x0 is the length of the main scanning line of the image data 200. The processing is also performed by the integer here. Consequently, ishy, which is the integer changed from the shy, is used as the shift amount, and the ishy is expressed by the following formula (9). The sub scanning shift amount ishy takes a positive value.

$$ishy = (\text{int})((x0 - x)/\text{stair } V) \ (\delta: \text{positive}) \quad (9)$$
$$= (\text{int})(x/\text{stair } V) \ (\delta: \text{negative})$$

By the sub scanning shift processing, the inclination of the original is corrected as shown in FIG. 5C, and a right image is reproduced.

FIGS. 8A-8C show the state of a movement of a memory area 210. As shown in FIGS. 8A-8C, a rectangular area 203 moves into the lower direction by the pixel every reading of the reading area 211. The rectangular area 203 includes the reading area 211, a delay area 212, and a read area 204. In the present embodiment, only the reading area 211 and the delay area 212 on the lower side of the reading area 211 are stored in the storage unit 3254. The reading area 211 and the delay area 212 are set as the memory area 210. However, correctly, if the inclination angle δ is positive, then the area for the coefficient stair V on the most right side of the image data 200 is not stored in the storage unit 3254, which will be described later.

The reason is that the image data of the read area 204 becomes unnecessary data after reading. The storage capacity necessary for the storage unit 3254 in the case of storing the image data in the memory area 210 consequently becomes about a half of the one in the case of storing the whole image data in the rectangular area 203. In this way, it becomes possible to suppress the storage capacity of the memory modules to the one suitable for incorporating the memory modules into a practical apparatus.

Moreover, because the memory area 210 is small, multileveling processing for decreasing the number of bits of image data at the front-end processes of the sub scanning shift processing is not executed. The multileveling processing is the processing of decreasing the number of bits of a pixel value, for example, the conversion of 8-bit image data to 2- or 4-bit image data, and is executed by a known processing method such as the error diffusion method and the dither method. The deterioration of image data by performing the multileveling processing can be consequently prevented.

Moreover, as described in JP Hei 10-336425A, an image receives the variable power of a different magnification in the main scanning direction and in the sub scanning direction at the time of the main scanning shift processing and the sub scanning shift processing, respectively. In order to faithfully reproduce an original image not only in the angle thereof but also in the shape thereof, it is theoretically necessary to perform a variable power correction. However, because the original inclination that is caused in reading is actually small, the variable power influenced in the shift processing is very small, and the correction is not necessary to be performed.

Figure 9A:
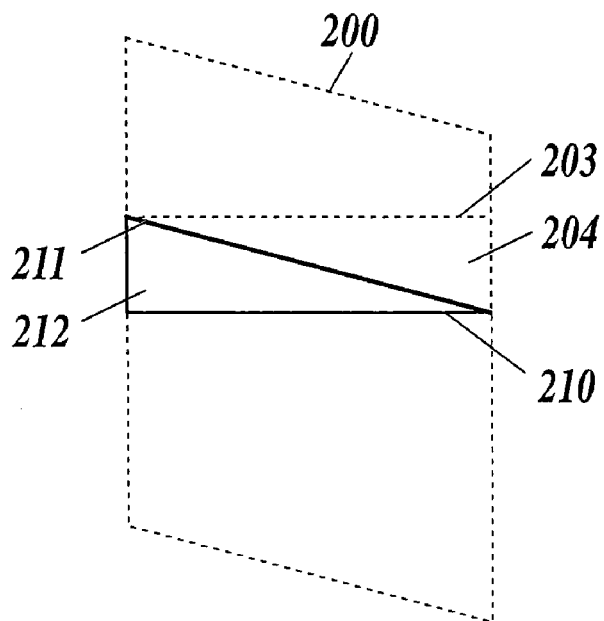
FIG. 9A is a view showing the memory area in the case where an inclination angle δ is positive.
Figure 9B:
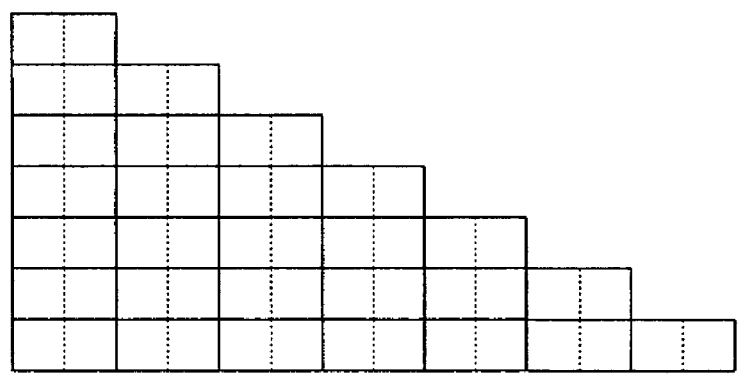
FIG. 9B is a view showing the arrangement of memory modules directly corresponding to the memory area.
Figure 10A:
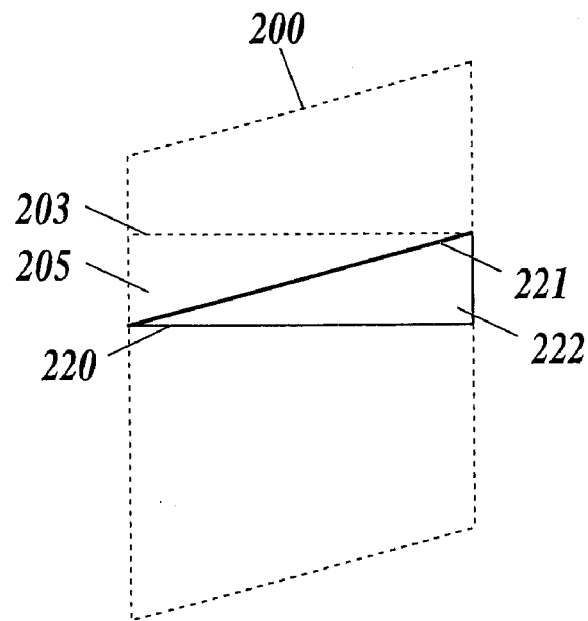
FIG. 10A is a view showing the memory area in the case where an inclination angle δ is negative.
Figure 10B:
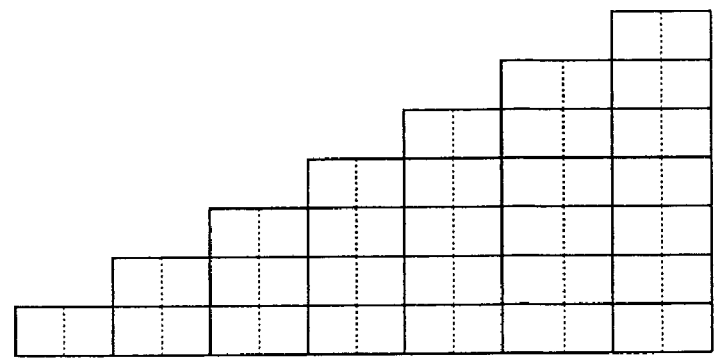
FIG. 10B is a view showing the arrangement of memory modules directly corresponding to the memory area.
Figure 12A:
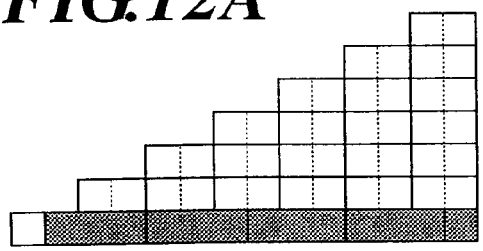
FIGS. 12A, 12B, 12C, 12D, 12E, and 12F are views showing a transition of data reading and writing of the memory modules in the case where the inclination angle δ is negative and the coefficient stair V=3.
Figure 12B:
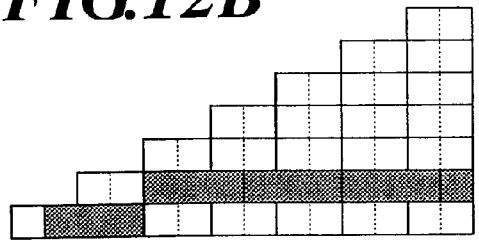
Figure 12C:
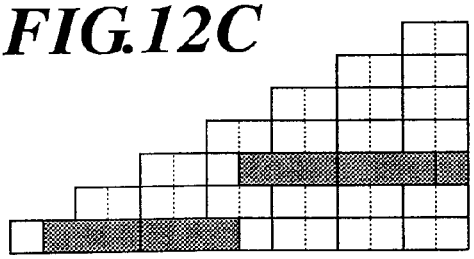
Figure 12D:
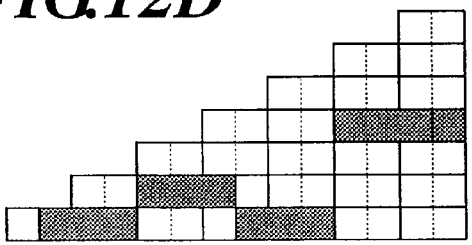
Figure 12E:
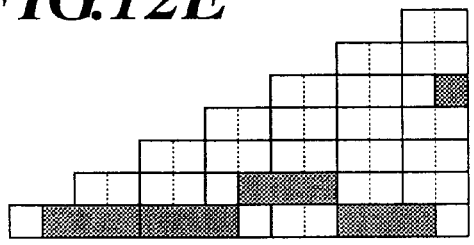
Figure 12F:
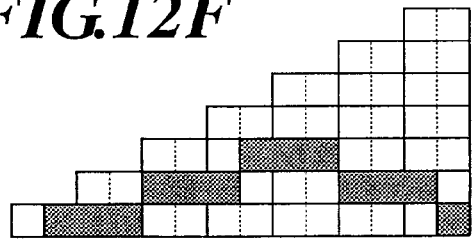

Next, the arrangement of the memory modules in the memory area will be described in each case of inclination angles δ of the image data 200 with reference to FIGS. 9A, 9B, 10A, and 10B. FIG. 9A shows the memory are 210 in the case where the inclination angle δ is positive. FIG. 9B shows the arrangement of the memory modules directly corresponding to the memory area 210. FIG. 10A shows a memory area 220 in the case where the inclination angle δ is negative. FIG. 10B shows the arrangement of the memory modules directly corresponding to the memory area 220.

First, the case where the angle δ is positive is examined. As shown in FIG. 9A, the rectangular area 203 therein contains the memory area 210 including the reading area 211 and the delay area 212 in the case where the inclination angle δ is positive. The memory modules may be arranged as shown in FIG. 9B in order to store the memory are 210 shown in FIG. 9A. The arrangement of the memory modules shown in FIG. 9B corresponds to the shape of the memory area 210, and the arrangement is set so that, as the sub scanning shift amount becomes larger, the number of the memory modules may become larger, and that the total storage capacity may consequently become larger.

Next, the case where the angle δ is negative will be examined. As shown in FIG. 10A, the rectangular area 203 therein contains the memory area 220 including a reading area 221 and a delay area 222 in the case where the inclination angle δ is negative. The memory modules may be arranged as shown in FIG. 10B in order to store the memory area 220 shown in FIG. 10A. The arrangement of the memory modules shown in FIG. 10B corresponds to the shape of the memory area 220, and the arrangement is set so that, as the sub scanning shift amount becomes larger, the number of the memory modules may become larger, and that the total storage capacity may consequently become larger.

Next, the transitions of the reading and the writing of data in the memory modules in FIGS. 9A, 9B, 10A, and 10B will be described. FIGS. 11A-11H show the transitions of the data reading and the data writing of the memory modules in the case where the inclination angle δ is negative and the coefficient stair V=2. Moreover, the memory modules are supposed to be reset every input of the image data 200.

Although it is not shown in FIG. 11A, the data signal DI to be input is output as it is as the data signal DO on the leftmost side in the main scanning line.

Consequently, in the case where the inclination angle δ is negative, the area (for two pixels) of the coefficient stair V on the leftmost side of the image data 200 is configured not to be stored in the memory. Moreover, in the case where the inclination angle δ is positive, the area for the coefficient stair V on the rightmost side of the image data 200 is configured not to be stored in the memory.

First, as shown in FIG. 11A, the data in the gray memory modules in the memory area is read to be output as the data signal DO, and the data signal DI in the present main scanning line is written. The main scanning line then moves to lower direction by one line. As shown in FIG. 11B, the data in the gray memory modules in the memory area is read to be output as the data signal DO, and the data signal DI in the present main scanning line (the main scanning line lower than the one in FIG. 11A by one line).

Similarly, as shown in FIGS. 11C-11H, the gray memory modules from which data is read and to which data is written, respectively, are transiting. The gray memory modules in the memory area are shifting to the memory modules from which reading has been foremost performed and to which writing has been foremost performed in the memory modules in the Y direction of the memory of each memory portion of the stair V in the X direction. By such a transition, the sub scanning shift quantities become larger as the value of the X axis becomes larger as to each memory portion of the stair V, and the data signal DO is output as the read data 301 in FIG. 7D.

FIGS. 12A-12F show a transition of the data reading and the data writing of the memory modules in the case where the inclination angle δ is negative and the coefficient stair V=3. Similarly to the case of FIGS. 11A-11H, the case where the inclination angle δ is negative and the coefficient stair V=3 will be examined. In the sub scanning shift processing, as shown in FIGS. 12A-12F, the gray memory modules from which data is read and to which data is written are transiting. By such a transition, the sub scanning shift quantities become smaller as the values of the X axis become larger as to each memory portion (for three pixels) of the stair V, and the data signal DO is output as the read data 301 of FIG. 7D.

Figure 13:
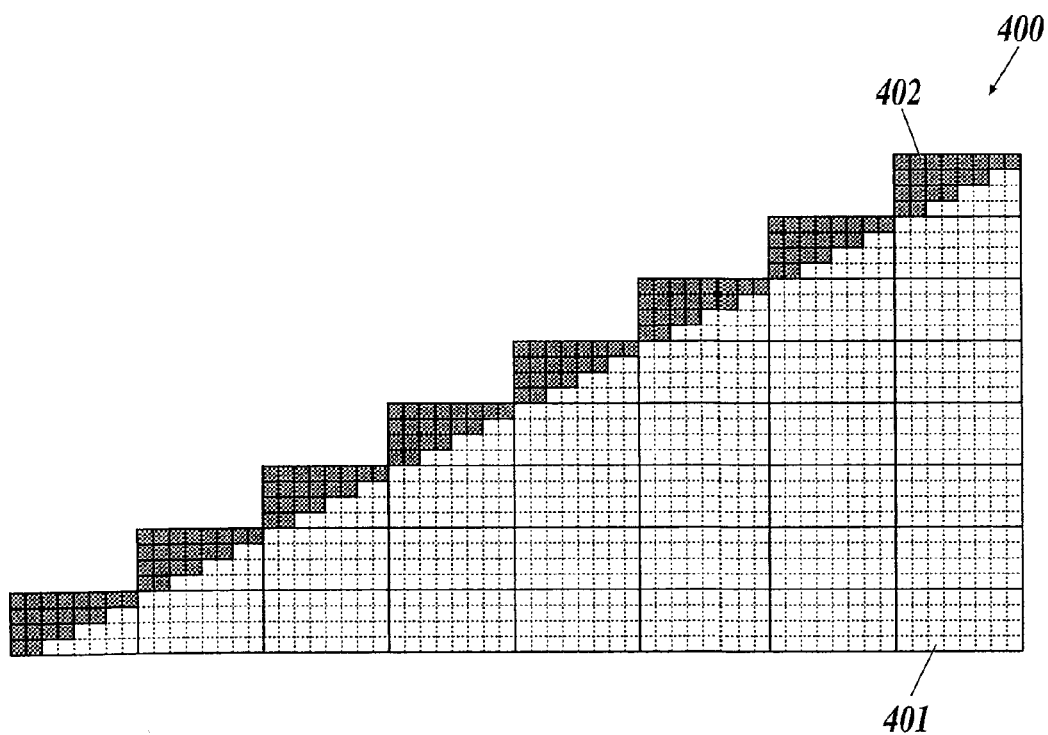
FIG. 13 is a view showing the configuration of a memory area.

FIG. 13 shows the configuration of a memory area 400. Although the above descriptions have shown the cases of the mounting of performing the selection of the memory modules of one pixel in the sub scanning direction and of two pixels in the main scanning direction, it is not actually realistic to set the memory modules to be driven to a certain degree size or less. Even in the case where the memory is built in the ASIC, a control unit area and an electric power source unit area become necessary to each memory module capable of being specified to be driven in the memory. Consequently, the area in the ASIC can be set to be smaller if the number of the memory modules to be selected at each drive is made to be smaller by forming the size of each of the memory modules to be as large as possible.

Consequently, for example, if large memory modules 401 as a drive unit are mounted into the memory in the memory area 400 as shown in FIG. 13, then some memory un-use areas 402 shown by gray in FIG. 13 arise.

Accordingly, the sub scanning shift processing unit 324 of the present embodiment is configured so that the memory area that is the divided, inverted and superposed memory area 400A as a first memory area is stored in the storage unit 3254 as shown in FIGS. 14A-14D. FIGS. 14A-14D show a procedure of dividing the memory area 400A into two parts, inverting the divided memory areas 400A, and superposing them.

Figure 14A:
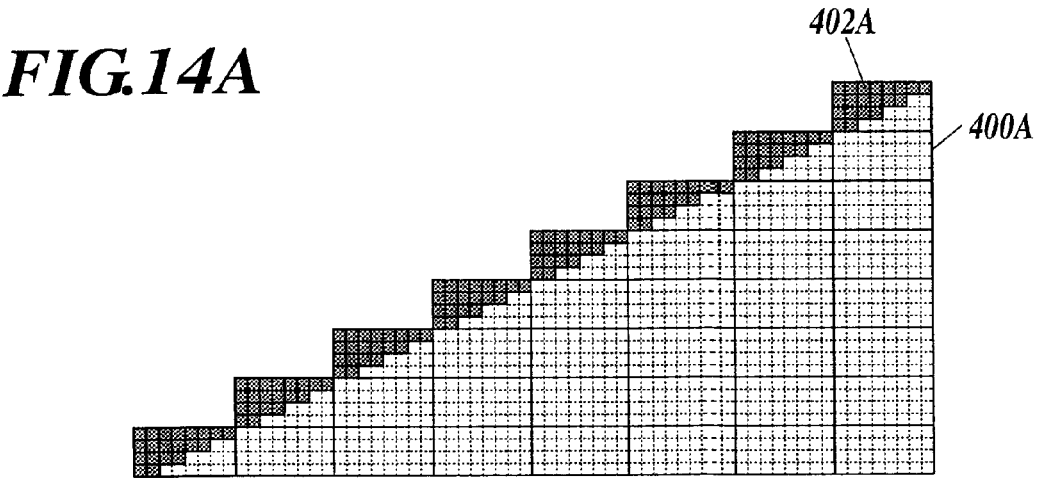
FIGS. 14A, 14B, 14C, and 14D are views showing a procedure of the division into two parts, the inversion, and the superposition of the memory area.
Figure 14B:
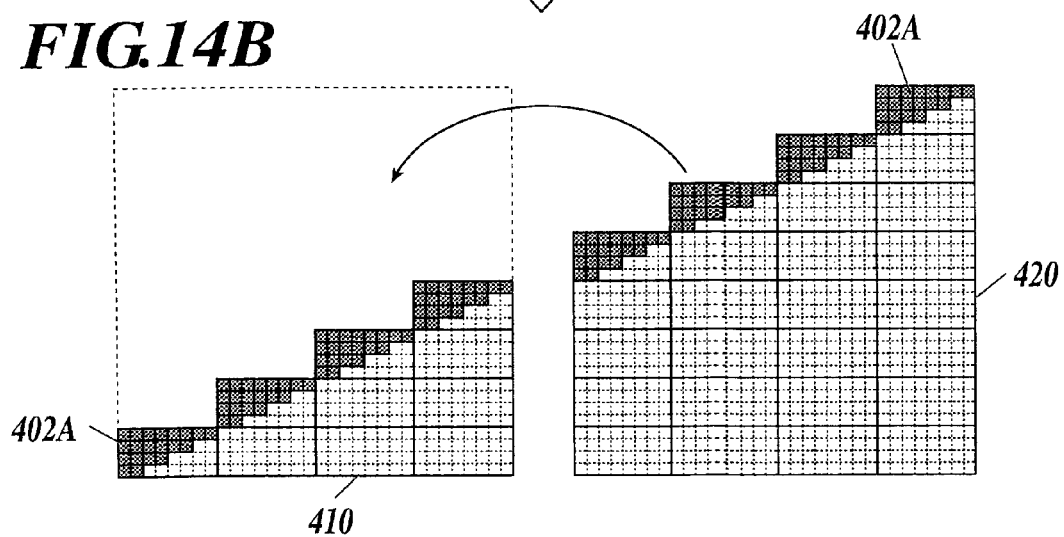

The memory area 400A is an area having a shape corresponding to that of the memory area 400, but the memory area 400A is considered as a different thing from the memory area 400, the shape of which is stored as it is. First, as shown in FIGS. 14A and 14B, the memory area 400A is divided into two parts at the center position in the X direction, and the divided pieces are denoted as memory areas 410 and 420. In the present embodiment, the number of pixels of the memory area 400A in the X direction is supposed to be an even number. The memory area 410 corresponding to the signal MSB=0 in FIG. 4. The memory area 420 corresponds to the signal MSB=1 in FIG. 4.

Figure 14C:
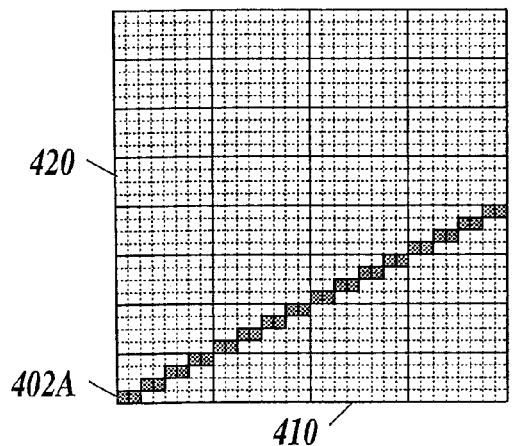

Then, as shown in FIGS. 14B and 14C, the memory area 420 is counterclockwise rotated (inverted) by 180°, and the memory un-use area 402A in the memory area 420 is superposed on the memory un-use area 402A in the memory area 410 to arrange the memory areas 410 and 420 so as to counteract the memory un-use areas 402A. By the processing like this, most of the memory un-use area 402 can be reduced.

Figure 14D:
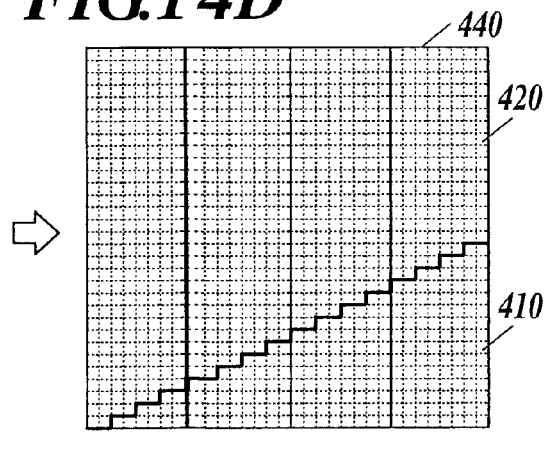

Furthermore, as shown in FIG. 14D, the memory area composed of the superposed memory areas 410 and 420 is vertically compressed, and the remaining memory un-use areas 402A in an oblique line is completely deleted, so that the superposed memory areas 410 and 420 form a memory area 440 having a rectangular structure as a second memory area. The storage unit 3254 having a storage capacity for storing the memory area 440, in which the memory un-use area is completely deleted, is mounted in the sub scanning shift processing unit 324.

Figure 15:
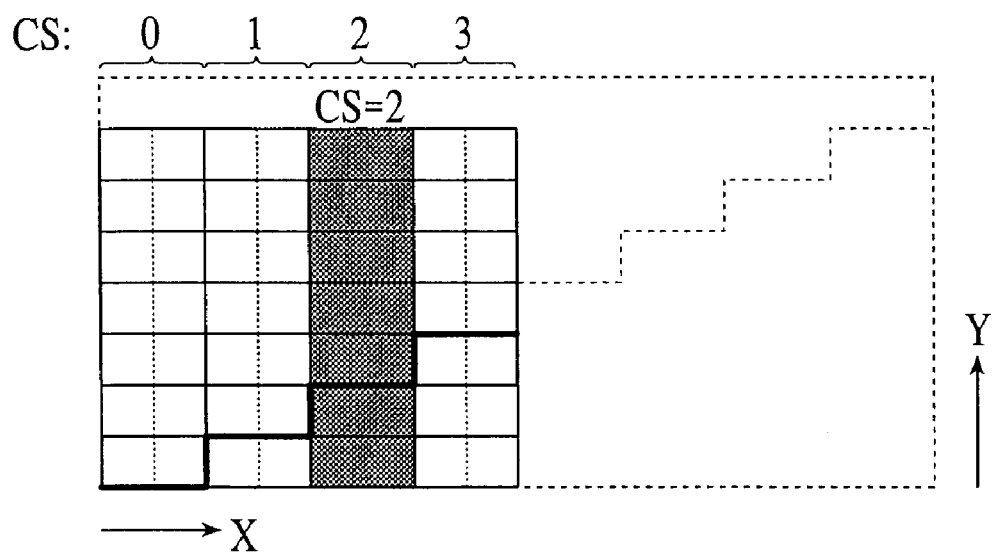
FIG. 15 is a view showing an arrangement and selection of the memory modules in the storage unit.

Next, with reference to FIG. 15, the arrangement of the memory modules in the storage unit 3254 and the selection of the memory modules will be described. In this description, a configuration in which the maximum sub scanning shift amount is 6 pixels will be described. FIG. 15 shows the arrangement of the memory modules in the storage unit 3254 and the selection of the memory modules.

As shown in FIG. 15, an address X and an address Y are given to each memory module in the storage unit 3254. Moreover, each memory unit shown as a regular square in FIG. 15 is supposed to correspond to a pixel. Each memory module is shown by solid lines in FIG. 15, and is a memory area composed of two pixels in the main scanning direction as a couple. Each memory module of the storage unit 3254 in FIG. 15 is the one in the case where the inclination angle δ is negative. Moreover, each memory area shown in FIG. 15 is arranged correspondingly to the address X and the address Y, and is not limited to the physical memory arrangement of the storage unit 3254. Consequently, all of the regular square memory units shown in FIG. 15 are the memories of the storage unit 3254.

The storage unit 3254 can be driven as the memories into the main scanning direction by the selection signal CS. The storage unit 3254 has a memory module group divided in the sub scanning direction by the pixel, and only the memory modules corresponding to the selection signal CS are driven. That is, simultaneously driven memory modules are one of the memory module group divided in the main scanning direction by the selection signal CS. For example, as shown in FIG. 15, in the case of the selection signal CS=2, only the memory modules (shown by gray) corresponding to the selection signal CS=2 among the memories in the storage unit 3254 are driven. Consequently, power consumption can be reduced and the calorific value of the storage unit 3254 can be also reduced in comparison with the case where all of the memory modules of the storage unit 3254 are driven. In FIG. 15, the power consumption becomes ¼ of that in the case where all of the memory modules are driven.

Figure 16:
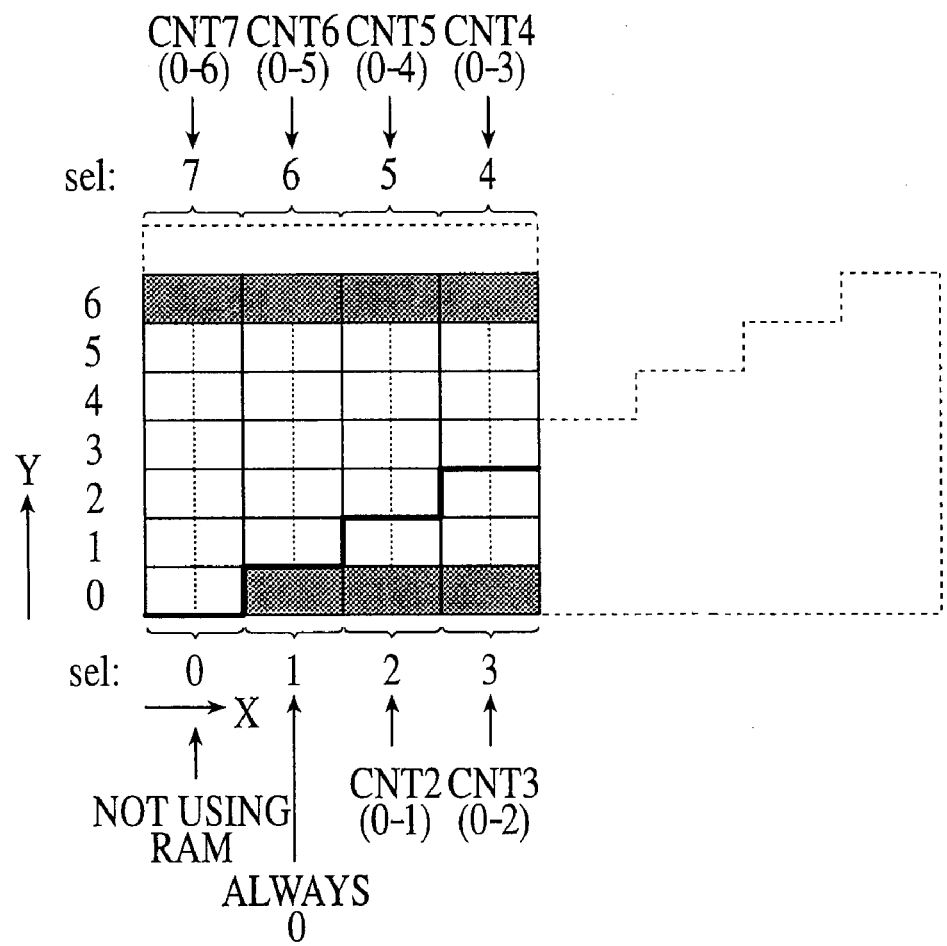
FIG. 16 is a view showing the memory modules and counter signals of a storage unit in the case where the inclination angle δ is negative and the coefficient stair V=2.
Figure 17:
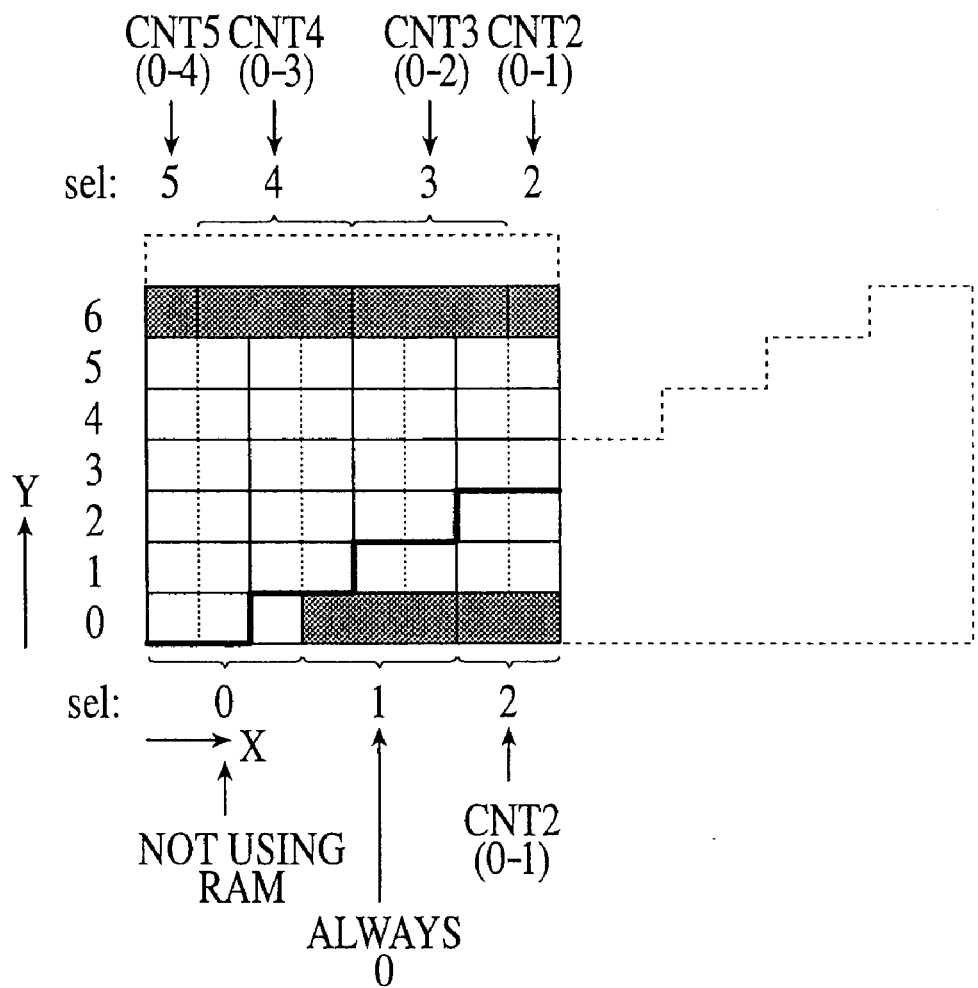
FIG. 17 is a view showing the memory modules and counter signals of the storage unit in the case where the inclination angle δ is negative and the coefficient stair V=3.

Next, the relations between the arrangement of the memory modules of the storage unit 3254 and the counter signals CNT2-CNT7 will be described correspondingly to the coefficient stair V in the case where the inclination angle δ of the image data 200 is negative with reference to FIGS. 16 and 17. FIG. 16 shows the relations between the memory modules of the storage unit 3254 and the counter signals in the case where the inclination angle δ is negative and the coefficient stair V is two. FIG. 17 shows the relations between the memory modules of the storage unit 3254 and the counter signals in the case where the inclination angle δ is negative and the coefficient stair V is three.

First, the memory modules of the storage unit 3254 in the case where the angle δ is negative and the coefficient stair V is two will be described. As shown in FIG. 16, each memory module at the address X is associated with any of the values (0-7) of the selection signal sel in the case of the coefficient stair V=2. The memory modules are associated with the selection signal sel by the block of two pixels in the main scanning direction. That is, this case is the one in which the memory module unit of the selection signal CS and the memory module unit of the selection signal sel agree with each other. The values of the selection signal sel correspond to the shift quantities (the counted values of the counters 3242-3247) into the sub scanning direction of image data.

To put it concretely, there are no memory modules corresponding to the selection signal sel=0, and the data signal DI is output from the sub scanning shift processing unit 324 as it is as the data signal DO. In the memory module corresponding to the selection signal sel=1, the address Y (=Y1) that is always 0 is input into the storage unit 3254, and the reading and the writing of image data are performed every reading of the image data on the main scanning line.

In the memory modules corresponding to the selection signal sel=2, the address Y (=Y1) corresponding to the counter signal CNT2 is input into the storage unit 3254, and the reading and the writing of image data are performed in the memory modules corresponding to the counted values (the circulation of 0-1) corresponding to the counter signal CNT2 every movement of the main scanning line. Similarly, in the memory modules corresponding to the selection signal sel=3, the address Y (=Y1) corresponding to the counter signal CNT3 is input into the storage unit 3254, and the reading and the writing of image data are performed in the memory modules corresponding to the counted values (the circulation of 0-2) corresponding to the counter signal CNT3 every movement of the main scanning line.

In the memory modules corresponding to the selection signal sel=4, the address Y (=6−Y1: a subtraction signal of the subtracting unit 3251) corresponding to the counter signal CNT4 is input into the storage unit 3254, and the reading and the writing of image data are performed in the memory modules corresponding to the counted values (the circulation of 0-3) corresponding to the counter signal CNT4 every movement of the main scanning line. Similarly, in the memory modules corresponding to the selection signals sel=5, 6, and 7, the addresses Y (=6−Y1) corresponding to the counter signals CNT5, CNT6, and CNT7, respectively, are input into the storage unit 3254, and the reading and the writing of image data are performed in the memory modules corresponding to the counted values (the circulations of 0-4, 0-5, and 0-6) corresponding to the counter signals CNT5, CNT6, and CNT7, respectively, every movement of the main scanning line.

The memory areas of the storage unit 3254 in the case where the angle δ is negative and the coefficient stair V is three will be examined. As shown in FIG. 17, each memory module at the address X is associated with any of the values (0-5) of the selection signal sel in the case of the coefficient stair V=3. The memory modules are associated with the selection signal sel by the block of three pixels in the main scanning direction. That is, this case is the one in which the memory module unit of the selection signal CS and the memory module unit of the selection signal sel do not agree with each other. The values of the selection signal sel correspond to the shift quantities (the counted values of the counters 3242-3247) into the sub scanning direction of image data.

To put it concretely, there are no memory modules corresponding to the selection signal sel=0, and the data signal DI is output from the sub scanning shift processing unit 324 as it is as the data signal DO. In the memory module corresponding to the selection signal sel=1, the reading and the writing of image data are performed every movement of the main scanning line in response to the input of the address Y (=Y1) that is always 0 into the storage unit 3254. In the memory modules corresponding to the selection signal sel=2, the addresses Y (=Y1, 6−Y1) corresponding to the counter signal CNT2 are input into the storage unit 3254, and the reading and the writing of image data are performed in the memory modules corresponding to the counted values (the circulation of 0-1) corresponding to the counter signal CNT2 every movement of the main scanning line.

Similarly, in the memory modules corresponding to the selection signals sel=3, 4, and 5, the addresses Y (=6−Y1) corresponding to the counter signals CNT3, CNT4, and CNT5 are input into the storage unit 3254, and the reading and the writing of image data are performed in the memory modules corresponding to the counted values (the circulations of 0-2, 0-3, and 0-4) corresponding to the counter signals CNT3, CNT4, and CNT5 every movement of the main scanning line.

In the case where the angle δ is positive, similarly, the memory modules of the storage unit 3254 are set according to the coefficient stair V.

Figure 18:
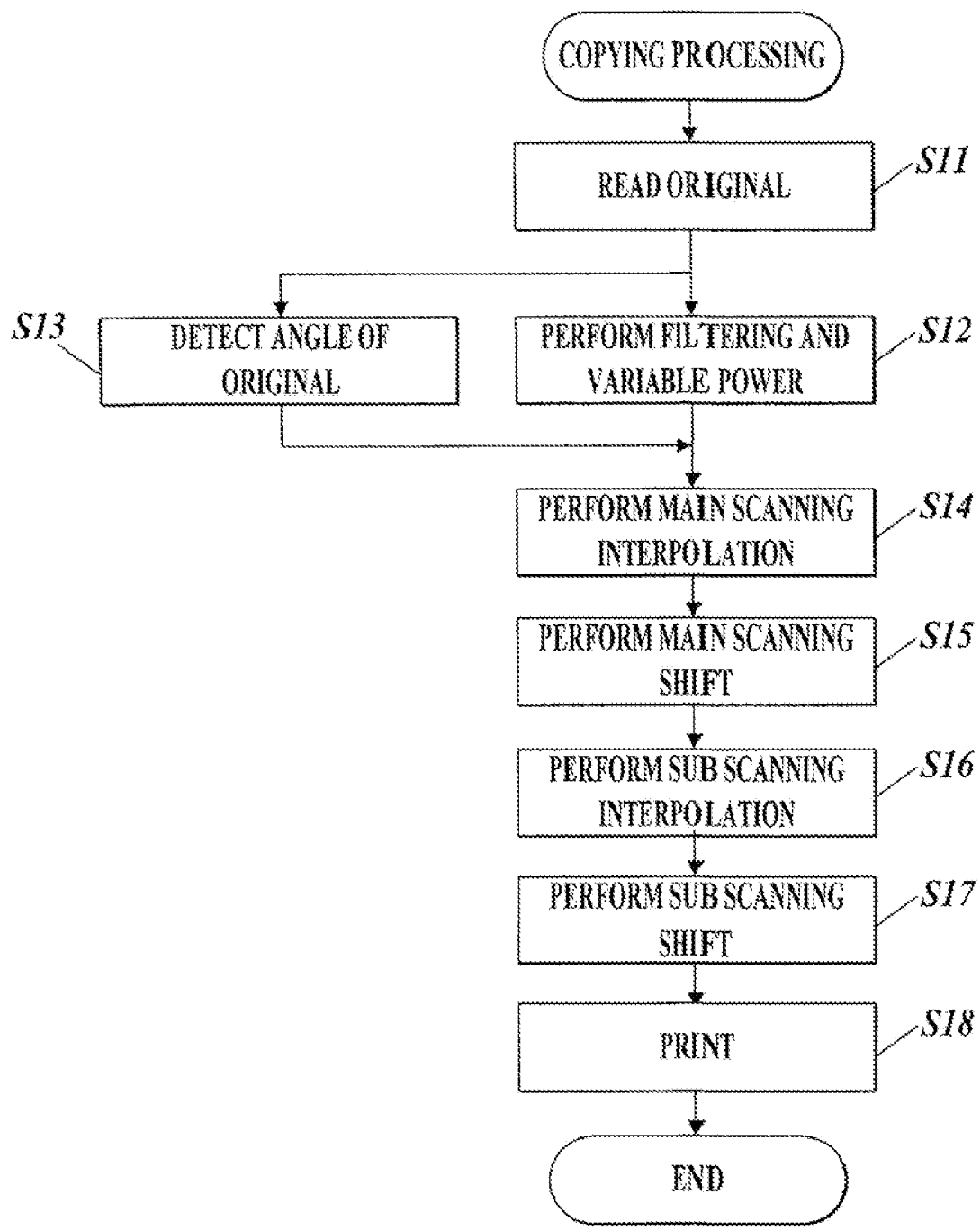
FIG. 18 is a flow chart showing copy processing.

Next, copying processing executed in the digital copier 1 will be described with reference to FIG. 18. FIG. 18 shows the flow of the copying processing.

An original is set on the original conveying unit 20 in advance. Moreover, it is supposed that a setting input such as variable power from a user is received through the operation unit 70. The copying processing is executed by the main body control unit 60 by, for example, an input of a copying instruction from a user through the operation unit 70 as a trigger. In the main body control unit 60, the copying processing is executed by the cooperation of a copying program, which has been read from the ROM and has been expanded in the RAM, and the CPU.

First, the scanner 10 is controlled by the main body control unit 60. By the control, the original is read by the scanner 10, and image data is obtained (step S11). At this time, the original conveying unit 20 is similarly controlled by the main body control unit 60, and time differences s are calculated by the time difference measuring unit 29.

The image processing control unit 33 is then controlled by the main body control unit 60. The image processing execution unit 31 is controlled by the image processing control unit 33. The image processing such as filtering and variable power is performed to the image data output from the scanner 10 by the image processing execution unit 31 by the control (step S12).

The original inclination angle θ is detected by the image processing control unit 33 based on the time differences s output from the formula (1) and the original conveying unit 20 in parallel with the step S12 (step S13).

The data of the formulae (2)-(4) are then read from the inclination detection ROM 40 by the image processing control unit 33, and the inclination angle δ, the stair H, and the stair V after a main scanning shift are calculated based on the data of the relational formulae (2)-(4) and the angle θ. The main scanning interpolation processing is performed to the image data output from the image processing execution unit 31 using the stair H by the main scanning interpolation processing unit 321 (step S14).

The main scanning shift amount ishx is then calculated by the main scanning shift processing unit 322 based on the formulae (5)-(7), and the main scanning shift processing is performed to the image data output from the main scanning interpolation processing unit 321 using the main scanning shift amount ishx (step S15).

The sub scanning interpolation processing is performed to the image data output from the main scanning shift processing unit 322 by the sub scanning interpolation processing unit 323 using the stair V (step S16). The sub scanning shift processing by the sub scanning shift amount ishy is performed to the image data output from the sub scanning interpolation processing unit 323 by the sub scanning shift processing unit 324 using the coefficient stair V (step S17).

The printer unit 50 is then controlled by the main body control unit 60. The image of the image data output from the sub scanning shift processing unit 324 is recorded on a sheet of recording paper by the printer unit 50 (step S18). The copying processing then ends.

Figure 19:
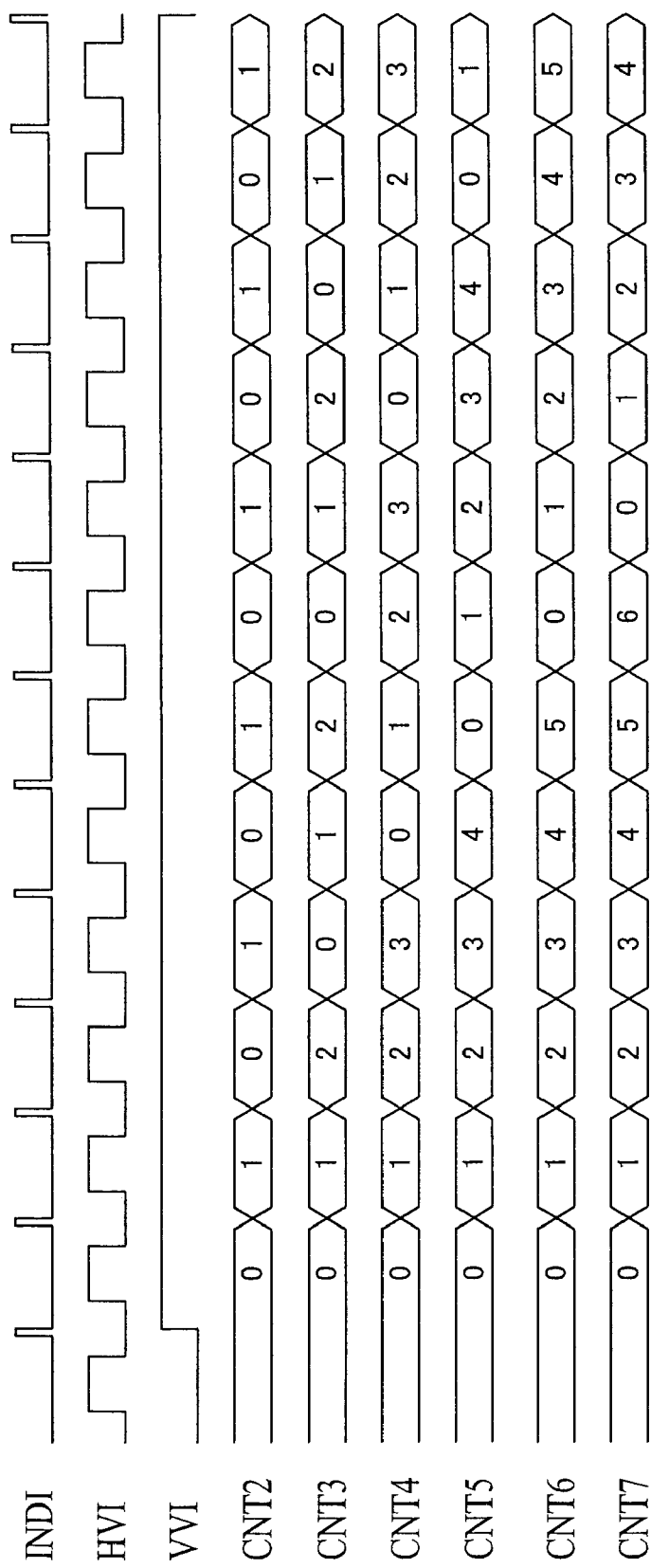
FIG. 19 is a timing chart of signals used in a sub scanning shift processing unit 324 in the case where the inclination angle δ is negative and the coefficient stair V=2.
Figure 20:
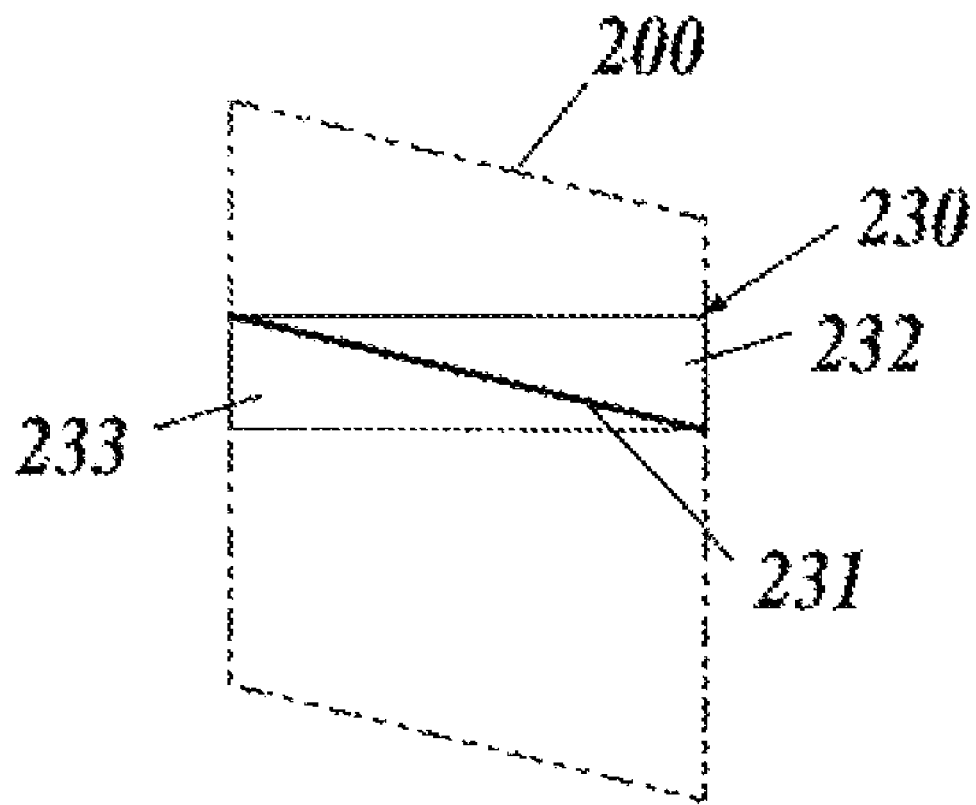
FIG. 20 is a schematic diagram showing conventional sub scanning shift processing.

Next, the sub scanning shift processing at the step S17 in the copy processing will be concretely described with reference to FIG. 19. FIG. 19 shows the flows of the timing of the signals to be used by the sub scanning shift processing unit 324 in the case where the inclination angle δ is negative and the coefficient stair V=2.

First, the case where the inclination angle δ is negative and the coefficient stair V=2 will be examined. In the sub scanning shift processing, the address signal adr and the selection signal sel both corresponding to the coefficient stair V (=2) are output every input of the high level of the main scanning effective signal HVI as shown in FIG. 19. Moreover, the sub scanning effective signal VVI and the main scanning synchronization signal INDI are input into the counters 3242-3247, and the counted values corresponding to the present reading area are output.

The input of the data of the main scanning line is started as the data signal DO correspondingly to the memory area in FIG. 11A, and the signal MSB is 0 at this time. On the leftmost side of the main scanning line, the selection signal sel is 0, and the data signal DI is output as it is as the data signal DO through the selector 3255.

The selection signal sel then becomes 1, and "0" is output from the selector 3248 as the address signal Y1. The address signal Y1 is input into the storage unit 3254 as the address signal Y through the selector 3252. In the storage unit 3254, the address signal X, the selection signal CS, and the address signal Y are input, and the data stored in the memory module at the second position from the leftmost side and at the address Y of 0 is read based on the addresses X and Y to be output as the data signal DO. Furthermore, the data signal DI is written in the memory area.

The selection signal sel then becomes 2, and the counter signal CNT2 is output from the selector 3248 as the address signal Y1. The address signal Y1 is input into the storage unit 3254 as the address signal Y through the selector 3252. The address signal X, the selection signal CS, and the address signal Y=CNT2 are input into the storage unit 3254, and the data that is stored in the memory module at the third position from the leftmost side at the address Y of 0 is read based on the addresses X and Y to be output through the selector 3255 as the data signal DO. Furthermore, the data signal DI is written in the memory area.

The selection signal sel then becomes 3, and the address signal X, the selection signal CS, and the address signal Y=CNT3 are similarly input into the storage unit 3254, and the data that is stored in the memory modules at the fourth position from the leftmost side at the address Y of 0 is read based on the addresses X and Y. The read data is output as the data signal DO through the selector 3255, and the data signal DI is written into the memory area.

The signal MSB then becomes 1. The selection signal sel becomes 4, and the counter signal CNT4 is output from the selector 3248 as the address signal Y1. The address signal Y1 is input into the storage unit 3254 through the subtracting unit 3251 and the selector 3252 as the address signal Y of (6−Y1). In the storage unit 3254, the address signal X, the selection signal CS, and the address signal Y=(6−CNT4) are input, and the data stored in the memory module on the rightmost side at the address Y of 6 is read based on the addresses X and Y to be output through the selector 3255 as the data signal DO. Furthermore, the data signal DI is written into the memory area.

Similarly, the selection signal sel takes 5, 6, and 7 in order, and the counter signals CNT5, CNT6, and CNT7 are output from the selector 3248 as the address signals Y1. The address signals Y1 are input into the storage unit 3254 through the subtracting unit 3251 and the selector 3252 as the address signals Y of (6−Y1). In the storage unit 3254, the address signal X, the selection signal CS, and the address signals Y=(6−CNT5), (6−CNT6), and (6−CNT7) are input, and the data stored in the memory modules at the second, the third, and the fourth positions from the rightmost side at the address Y of 6 is read based on the addresses X and Y to be output to the selector 3255 as the data signals DO. Furthermore, the data signals DI are written into the memory areas.

Next, the processing moves to the next main scanning line correspondingly to FIG. 11B. The signal MSB becomes 0. First, the selection signal sel is 0, and the data signal DI is output as it is through the selector 3255 as the data signal DO.

The selection signal sel then becomes 1, and "0" is output from the selector 3248. The address signal Y1 is input into the storage unit 3254 through the subtracting unit 3251 and the selector 3252 as the address signal Y. In the storage unit 3254, the address signal X, the selection signal CS, and the address signal Y are input, and the data stored in the memory module at the second position from the leftmost side at the address Y of C is read based on the addresses X and Y to be output as the data signal DO through the selector 3255. Furthermore, the data signal DI is written into the memory area.

The selection signal sel then becomes 2 and 3 in order, and the counter signals CNT2 and CNT3 are output from the selector 3248 as the address signals Y1. The address signals Y1 are input into the storage unit 3254 as the address signals Y through the subtracting unit 3251 and the selector 3252. In the storage unit 3254, the address signal X, the selection signal CS, and the address signals Y=CNT2 and CNT3 are input, and the data that is stored in the memory modules at the third and the fourth positions from the leftmost side at the address Y of 1 is read based on the addresses X and Y to be output as the data signal DO through the selector 3255. Furthermore, the data signal DI is written into the memory areas.

The signal MSB then becomes 1. The selection signal sel takes 4, 5, 6, and 7 in order, and the counter signals CNT4, CNT5, CNT6, and CNT7 are output from the selector 3248 as the address signals Y1. The address signals Y1 are input into the storage unit 3254 as the address signals Y of (6−Y1) through the subtracting unit 3251 and the selector 3252. In the storage unit 3254, the address signal X, the selection signal CS, and the address signals Y=(6−CNT4), (6−CNT5), (6−CNT6), and (6−CNT7) are input, and the data stored in the memory modules at the first, the second, the third, and the fourth positions from the rightmost side at the address Y of 5 is read based on the addresses X and Y to be output as the data signal DO through the selector 3255. Furthermore, the data signals DI are written into the memory areas.

In such a way, correspondingly to FIGS. 11A-11H, the data in the reading area 221 is read and the data in the main scanning line is written in order every shift of the main scanning line as for each memory module of the storage unit 3254, and the read data is being output as the read data 301 of the main scanning line after the sub scanning shift. However, it is after the appearance of an image data value at the portion corresponding to the leftmost side of the main scanning line that the image data of the main scanning line after the subs scanning shift is started to be output.

Although the case where the coefficient stair V=2 has been described here, the present invention is not limited to the case, but the above descriptions are similarly true in any other values of the coefficient stair V. The sub scanning shift amount is changed according to the inclination of the angle δ of the image data 200. Moreover, although the cases where the inclination angle δ is negative have been described, the present invention is not limited to these cases, but the case where the inclination angle δ is positive can be realized by the similar processing.

As described above, according to the present embodiment, the memory area 400A corresponding not to the rectangular area 203 of the image data 200 but to the memory areas 210 and 220 is divided into two parts at the center position in the main scanning direction, inverted, and superposed with the other divided piece to counteract the memory un-use areas to be the rectangular memory area 440. The memory modules of the storage unit 3254 are selected according to the memory area 440, and the image data after the sub scanning interpolation processing is read and writing is performed. Consequently, the memory un-used areas are removed to enable the great reducing of the storage capacity of the storage unit 3254 to be used for the sub scanning shift, and the power consumption and the calorific value of the storage unit 3254 can be reduced.

Moreover, the inclination correction processing unit 32 (sub scanning shift processing unit 324) can be easily mounted in the ASIC, and the package of the ASIC can be made to be smaller. Furthermore, the number of the terminals of the ASIC can be also decreased. Moreover, by reducing the calorific value of the storage unit 3254, the heat radiation measures of a substrate and a housing can be unnecessary.

Moreover, by obtaining image data from an original with the scanner 10, the shift processing and the interpolation processing in the main scanning direction and the sub scanning direction can be performed with the image processing unit 30.

Moreover, because a plurality of areas of the storage unit 3250 in the main scanning direction is driven one by one according to the selection signal CS, the power consumption and the calorific value of the storage unit 3254 can be easily reduced.

Moreover, the addresses of the memory modules of the storage unit 3254 from which and to which the data reading and the data writing are performed, respectively, can be easily specified (selected) with the sub scanning shift control unit 3241, the counters 3242-3247, the selector 3248, the inverting unit 3249, the selectors 3250 and 3252, and the subtracting unit 3251. Moreover, the circulation quantities (counted values) according to the sub scanning shift quantities can be easily produced with the counters 3242-3247. Moreover, the Y direction of the memory area 420, which is produced by dividing a memory area into two parts and inverting one piece of the two parts, can be easily specified based on the signal MSB with the subtracting unit 3251 and the selector 3252.

Moreover, because the image data in the areas where no sub scanning shift quantities of the main scanning line of the image data 200 exist is stored and the image data is output as it is as the data signal DO by means of the comparator 3253 and the selector 3255, the storage capacity of the storage unit 3254 to be used for the sub scanning shift can be more reduced.

The descriptions concerning the above embodiment are related to the examples of the suitable image processing apparatus and the suitable image reading apparatus according to the present invention, and the image processing apparatus and the image reading apparatus of the present invention are not limited to the above ones.

For example, although a description has been given to the case where the upper limit counted value of the memory modules in the storage unit 3254 in the sub scanning shift processing in the above embodiment is 6, the upper limit counted value is not limited to 6, but may be set to 5 or less or 7 or more. If the upper limit counted value of the memory modules is increased, the sub scanning shift processing can be performed to the image data having a large upper limit inclination angle δ. If the upper limit counted value of the memory modules is decreased, the storage capacity of the storage unit 3254 can be further reduced.

Moreover, although the digital copier 1 as an image reading apparatus including the scanner 10 has been described in the above embodiment, the present invention is not limited to the digital copier 1. The present invention may be a scanner apparatus as the image reading apparatus, a facsimile machine including the image reading apparatus, a multi function peripheral (MFP), or the like. Moreover, the present invention may be an image processing apparatus having only the function of performing image processing including the sub scanning shift processing to the image data read by an image reading apparatus as a separated body. Furthermore, the present invention can be used for the correction of a setting inclination of a printer head to the sub scanning direction in a printer apparatus including a solid state scanning type printer head such as a light emitting diode (LED) array and a PLZT optical shutter array.

Moreover, the detailed configuration and the detailed operation of each unit constituting the digital copier 1 of the above embodiment may be suitably changed within the range of not departing from the scope of the present invention.

The present U.S. patent application claims a priority under the Paris Convention of Japanese patent application No. 2006-262977 filed on Sep. 27, 2006, and is entitled to the benefit thereof for a basis of correction of an incorrect translation.

What is claimed is:

1. An image processing apparatus comprising:
    a storage unit including a plurality of memory modules to store image data subjected to main scanning shift processing; and
    a control unit for:
        dividing a first memory area at a center position in a main scanning direction, the first memory area set to increase a total storage capacity as a shift amount in a sub scanning direction becomes larger;
        superposing divided memory areas of the first memory area such that memory un-use areas of the divided memory areas are counteracted by each other to set a second memory area; and
        selecting the memory modules corresponding to the second memory area, and reading the image data from and writing the image data to the memory modules, by which sub scanning shift processing is performed on the image data.

2. The image processing apparatus of claim 1, wherein the memory modules are separately arranged in a plurality of areas in the main scanning direction in the storage unit, and
    the control unit selects one area of the plurality of areas in the main scanning direction, and reads the image data from and writes the image data to the one area.

3. The image processing apparatus of claim 1, wherein the control unit circularly selects a memory module from the selected memory modules according to the shift amount in the sub scanning direction, the image data being read from and written to the selected memory module.

4. The image processing apparatus of claim 3, wherein the control unit includes:
    a sub scanning shift control unit outputting an address in the main scanning direction of the storage unit for reading the image data from and writing the image data to the storage unit;
    a counter obtaining a counted value indicating a circulation amount according to the shift amount in the sub scanning direction;
    a first selector selecting a counted value from the counted value to output the selected counted value as an address in the sub scanning direction of the first memory area; and
    an address changing unit changing the address in the sub scanning direction of the first memory area into an address in the sub scanning direction of the second memory area based on a most significant bit of the address in the main scanning direction of the storage unit so as to output the address in the sub scanning direction of the second memory area.

5. The image processing apparatus of claim 1, further comprising a second selector selecting image data from among the image data read from the storage unit and the image data subjected to the main scanning shift processing to output the selected image data.

6. The image processing apparatus of claim 1, further comprising an interpolation processing unit performing interpolation processing on the image data subjected to the main scanning shift processing, wherein
    the control unit performs the sub scanning shift processing on the image data subjected to the interpolation processing.

7. An image reading apparatus comprising:
    a scanner reading an image of an original to output image data;
    a main scanning shift processing unit performing main scanning shift processing on the outputted image data;
    a storage unit including a plurality of memory modules, to store image data subjected to the main scanning shift processing; and
    a control unit for:
        dividing a first memory area at a center position in a main scanning direction, the first memory area set to increase a total storage capacity as a shift amount in a sub scanning direction becomes larger;
        superposing divided memory areas of the first memory area such that memory un-use areas of the divided memory areas are counteracted by each other to set a second memory area; and
        selecting the memory modules corresponding to the second memory area, and reading the image data from and writing the image data to the memory modules, by which sub scanning shift processing is performed on the image data.

8. The image reading apparatus of claim 7, wherein
    the memory modules are separately arranged in a plurality of areas in the main scanning direction in the storage unit, and
    the control unit selects one area of the plurality of areas in the main scanning direction, and reads the image data from and writes the image data to the one area.

9. The image reading apparatus of claim 7, wherein the control unit circularly selects a memory module from the selected memory modules according to the shift amount in the sub scanning direction, the image data being read from and written to the selected memory module.

10. The image reading apparatus of claim 9, wherein the control unit includes:
    a sub scanning shift control unit outputting an address in the main scanning direction of the storage unit for reading the image data from and writing the image data to the storage unit;
    a counter obtaining a counted value indicating a circulation amount according to the shift amount in the sub scanning direction;
    a first selector selecting a counted value from the counted value to output the selected counted value as an address in a second the sub scanning direction of the first memory area; and
    an address changing unit changing the address in the sub scanning direction of the first memory area into an address in the sub scanning direction of the second memory area based on a most significant bit of the address in the main scanning direction of the storage unit so as to output the address in the sub scanning direction of the second memory area.

11. The image reading apparatus of claim 7, further comprising a second selector selecting image data from among the image data read from the storage unit and the image data subjected to the main scanning shift processing to output the selected image data.

12. The image reading apparatus of claim 7, further comprising an interpolation processing unit performing interpolation processing on the image data subjected to the main scanning shift processing, wherein
    the control unit performs the sub scanning shift processing on the image data subjected to the interpolation processing.

\* \* \* \* \*